United States Patent
Hu

(10) Patent No.: US 10,924,294 B2
(45) Date of Patent: *Feb. 16, 2021

(54) EVOLVED MULTIMEDIA BROADCAST/MULTICAST SERVICE (EMBMS) SYSTEM AND EMBMS SYSTEM MANAGEMENT METHOD

(71) Applicant: Huawei Technologies Co., Ltd., Shenzhen (CN)

(72) Inventor: Weiqi Hu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/548,996

(22) Filed: Aug. 23, 2019

(65) Prior Publication Data
US 2020/0052919 A1 Feb. 13, 2020

Related U.S. Application Data

(63) Continuation of application No. 15/860,107, filed on Jan. 2, 2018, now Pat. No. 10,397,012, which is a
(Continued)

(51) Int. Cl.
*H04L 12/18* (2006.01)
*H04W 88/16* (2009.01)
*H04W 88/08* (2009.01)

(52) U.S. Cl.
CPC .......... *H04L 12/189* (2013.01); *H04L 12/185* (2013.01); *H04W 88/16* (2013.01); *H04W 88/08* (2013.01)

(58) Field of Classification Search
None
See application file for complete search history.

(56) References Cited

U.S. PATENT DOCUMENTS 10,397,012 B2 * 8/2019 Hu .................... H04L 12/185
2008/0274759 A1 11/2008 Chen et al.
(Continued)

FOREIGN PATENT DOCUMENTS

CN 101242353 A 8/2008
CN 101304550 A 11/2008
(Continued)

*Primary Examiner* — Bunjob Jaroenchonwanit
(74) *Attorney, Agent, or Firm* — Slater Matsil, LLP

(57) ABSTRACT

Embodiments of the present disclosure provide an eMBMS system that includes a GW-C device connected to a mobility management entity and broadcast/multicast service center and a GW-U device connected to a base station and the mobility management entity. The GW-C device is configured to perform core network signaling interaction with the broadcast/multicast service center and the mobility management entity, and to send a forwarding indication message to the GW-U device. The GW-U device is configured to receive signaling from the base station and send the signaling to the GW-C device according to the forwarding indication message. The GW-C device is further configured to receive and process the signaling from the GW-U device. The GW-U device is further configured to send a received broadcast/multicast service data packet to the base station according to the forwarding indication message.

20 Claims, 10 Drawing Sheets

Related U.S. Application Data continuation of application No. PCT/CN2015/083358, filed on Jul. 6, 2015.

(56) References Cited

U.S. PATENT DOCUMENTS

| | | |
|---|---|---|
| 2008/0311949 A1 | 12/2008 | Koskinen et al. |
| 2009/0111458 A1 | 4/2009 | Fox et al. |
| 2010/0008280 A1 | 1/2010 | Ornbo et al. |
| 2010/0197239 A1 | 8/2010 | Catovic et al. |
| 2010/0254352 A1 | 10/2010 | Wang et al. |
| 2011/0021224 A1 | 1/2011 | Koskinen et al. |
| 2011/0085489 A1 | 4/2011 | Rydnell et al. |
| 2011/0116433 A1 | 5/2011 | Dorenbosch |
| 2012/0008525 A1 | 1/2012 | Koskinen |
| 2012/0082073 A1 | 4/2012 | Andreasen et al. |
| 2013/0294320 A1 | 11/2013 | Jactat et al. |
| 2013/0294326 A1 | 11/2013 | Jiao et al. |
| 2014/0011519 A1 | 1/2014 | Lee et al. |
| 2014/0078988 A1 | 3/2014 | Kant et al. |
| 2014/0198712 A1 | 7/2014 | Howard |
| 2014/0219183 A1 | 8/2014 | Xu et al. |
| 2015/0110095 A1 | 4/2015 | Tan et al. |
| 2015/0139075 A1 | 5/2015 | Bosch et al. |
| 2015/0163090 A1 | 6/2015 | Tsubouchi |
| 2015/0223104 A1 | 8/2015 | Xu |
| 2015/0359019 A1 | 12/2015 | Chen et al. |
| 2016/0157274 A1 | 6/2016 | Akiyoshi |
| 2016/0301601 A1 | 10/2016 | Anand et al. |
| 2016/0316351 A1 | 10/2016 | Kodaypak et al. |
| 2017/0208634 A1 | 7/2017 | Bharatia et al. |
| 2018/0146362 A1 | 5/2018 | Hou et al. |
| 2018/0220479 A1 | 8/2018 | Shu et al. |
| 2018/0262424 A1 | 9/2018 | Roeland et al. |
| 2018/0332441 A1 | 11/2018 | Shaw et al. |

FOREIGN PATENT DOCUMENTS

| | | |
|---|---|---|
| CN | 101931876 A | 12/2010 |
| EP | 1367841 A2 | 12/2003 |
| WO | 2014198020 A1 | 12/2014 |

\* cited by examiner

EVOLVED MULTIMEDIA BROADCAST/MULTICAST SERVICE (EMBMS) SYSTEM AND EMBMS SYSTEM MANAGEMENT METHOD

CROSS-REFERENCE TO RELATED APPLICATIONS

This application is a continuation of U.S. patent application Ser. No. 15/860,107, filed on Jan. 2, 2018, which is a continuation of International Application No. PCT/CN2015/083358, filed on Jul. 6, 2015. All of the afore-mentioned patent applications are hereby incorporated by reference in their entireties.

TECHNICAL FIELD

The present disclosure relates to the computer field, and in particular, to an evolved multimedia broadcast/multicast service (eMBMS) system and an eMBMS system management method.

BACKGROUND

A logical architecture of an existing eMBMS system is shown in FIG. 1 and includes an evolved NodeB (eNB), a multi-cell/multicast coordination entity (MCE), a mobility management entity (MME), an MBMS gateway (MBMS-GW), and a broadcast/multicast service center (BM-SC). The eNB connects to the MBMS-GW using an M1 interface, the eNB connects to the MCE using an M2 interface, the MCE connects to the MME using an M3 interface, the MME connects to the MBMS-GW using an Sm interface, and the MBMS-GW connects to the BM-SC using a SGmb interface and an SGi-mb interface.

The MBMS-GW in this system has both a control plane function and a user plane function. The control plane function is responsible for receiving and processing session control signaling of an MBMS bearer service from the BM-SC and necessary information provided by the gateway user plane function, and for performing signaling interaction with the eNB.

The gateway user plane function is responsible for transiting signaling between the BM-SC and the control plane function, receiving a broadcast/multicast service data packet from the BM-SC, and sending the broadcast/multicast service data packet to the eNB.

However, with network evolution and service innovation, when a new function is added into or a new service is deployed in a control plane of the MBMS-GW, a forwarding plane may need to be modified. This may increase modification costs and is not conducive to new service deployment.

SUMMARY

The present disclosure provides an eMBMS system and an eMBMS system management method. Embodiments of the present disclosure may allow a control plane function and a forwarding plane function of an MBMS-GW to evolve independently.

In some embodiments, to achieve the foregoing objectives, the following technical solutions are adopted in the present disclosure.

According to a first aspect, an eMBMS system is provided and includes a broadcast/multicast service center, a base station, a mobility management entity connected to the base station, a gateway control plane (GW-C) device connected to the mobility management entity and the broadcast/multicast service center, and a gateway user plane (GW-U) device connected to the base station and the broadcast/multicast service center. The GW-C device connects to the GW-U device. The GW-C device is configured to perform core network signaling interaction with the broadcast/multicast service center and the mobility management entity and send a forwarding indication message to the GW-U device. The forwarding indication message is for instructing the GW-U device to process a packet received by the GW-U device. The GW-U device is configured to receive signaling sent by the base station and send the signaling to the GW-C device according to the forwarding indication message. The GW-C device is further configured to receive and process the signaling sent by the GW-U device. The GW-U device is further configured to, in a data transmission procedure, receive a broadcast/multicast service data packet sent by the broadcast/multicast service center and send the broadcast/multicast service data packet to the base station according to the forwarding indication message.

In a first possible implementation of the first aspect, the GW-C device is configured to, in a session establishment procedure, receive a first session start request message sent by the broadcast/multicast service center and send a second session start request message to the mobility management entity. The first session start request message is for establishing a bearer between the GW-U device and the broadcast/multicast service center, and the second session start request message is for establishing a bearer between the base station and the GW-U device.

With reference to the first aspect or the first possible implementation of the first aspect, in a second possible implementation, the GW-U device connects to the broadcast/multicast service center using an SGi-mb interface, and the GW-C device is further configured to allocate, when a sending manner on the SGi-mb interface is a unicast manner, a destination User Datagram Protocol (UDP) port corresponding to the SGi-mb interface.

With reference to any possible implementation of the first aspect, or the first to the second possible implementations of the first aspect, in a third possible implementation, the GW-U device connects to the broadcast/multicast service center using an SGi-mb interface, and the GW-C device is further configured to send, when a sending manner on the SGi-mb interface is a multicast manner, a multicast group join instruction message to the GW-U device. The multicast group join instruction message includes a first multicast group join request message, and is for instructing the GW-U device to send the first multicast group join request message to the broadcast/multicast service center. The GW-U device is further configured to send the first multicast group join request message to the broadcast/multicast service center. The broadcast/multicast service center is configured to add, according to the first multicast group join request message, the GW-U device into an IP multicast group using the broadcast/multicast service center as a source point.

With reference to any possible implementation of the first aspect, or the first to the third possible implementations of the first aspect, in a fourth possible implementation, the GW-U device connects to the base station using an M1 interface, and the GW-C device is further configured to allocate an IP multicast address of the M1 interface and a tunnel identifier. The IP multicast address is for identifying an IP multicast group using the GW-U device as a source point.

With reference to any possible implementation of the first aspect, or the first to the fourth possible implementations of the first aspect, in a fifth possible implementation, the forwarding indication message includes a first forwarding rule, and the first forwarding rule is a rule used when the GW-U device processes the signaling sent by the base station to the GW-U device. The GW-U device is configured to receive a second multicast group join request message sent by the base station, preprocess the second multicast group join request message according to the first forwarding rule, and send a preprocessed second multicast group join request message to the GW-C device. The GW-C device is further configured to add. after receiving the preprocessed second multicast group join request message and according to the preprocessed second multicast group join request message, the base station into the IP multicast group using the GW-U device as the source point.

With reference to any possible implementation of the first aspect, or the first to the fifth possible implementations of the first aspect, in a sixth possible implementation, the forwarding indication message includes a second forwarding rule, and the second forwarding rule is a rule used when the GW-U device processes the packet sent by the broadcast/multicast service center to the GW-U device. The GW-U device is configured to, in the data transmission procedure, receive the broadcast/multicast service data packet sent by the broadcast/multicast service center, and send the broadcast/multicast service data packet to the base station according to the second forwarding rule.

With reference to any possible implementation of the first aspect, or the first to the sixth possible implementations of the first aspect, in a seventh possible implementation, the GW-C device is configured to, in a session termination procedure, receive a first session termination request message sent by the broadcast/multicast service center, the first session termination request message including specified time information, and release a bearer context at a moment specified by the specified time information.

With reference to any possible implementation of the first aspect, or the first to the seventh possible implementations of the first aspect, in an eighth possible implementation, the GW-C device is configured to send the forwarding indication message to the GW-U device at the moment specified by the specified time information. The forwarding indication message includes a rule deletion instruction. The GW-U device is further configured to delete, according to the rule deletion instruction, a second forwarding rule used when the GW-U device processes the broadcast/multicast service data packet.

With reference to any possible implementation of the first aspect, or the first to the eighth possible implementations of the first aspect, in a ninth possible implementation, the GW-C device is further configured to send a second session termination request message to the mobility management entity. The second session termination request message includes the specified time information, such that the mobility management entity sends the specified time information to the base station and the base station releases the bearer context according to the specified time information.

With reference to any possible implementation of the first aspect, or the first to the ninth possible implementations of the first aspect, in a tenth possible implementation, the GW-U device is further configured to receive a first multicast group removal request message sent by the base station, preprocess the first multicast group removal request message according to a first forwarding rule of the GW-U device, and send a preprocessed first multicast group removal request message to the GW-C device The GW-C device is further configured to remove, after receiving the preprocessed first multicast group removal request message and according to the preprocessed first multicast group removal request message, the base station from the IP multicast group using the GW-U device as the source point.

With reference to any possible implementation of the first aspect, or the first to the tenth possible implementations of the first aspect, in an eleventh possible implementation, if the sending manner on the SGi-mb interface between the broadcast/multicast service center and the gateway user plane device is the multicast manner, the GW-C device is further configured to send a multicast group removal instruction message to the GW-U device. The multicast group removal instruction message includes a second multicast group removal request message and is for instructing the GW-U device to send the second multicast group removal request message to the broadcast/multicast service center The GW-U device is further configured to send the second multicast group removal request message to the broadcast/multicast service center. The second multicast group removal request message is for instructing the broadcast/multicast service center to remove the GW-U device from the IP multicast group using the broadcast/multicast service center as the source point.

According to a second aspect, an eMBMS system management method is applied to an eMBMS system, where the eMBMS system includes a broadcast/multicast service center, a base station, a mobility management entity connected to the base station, a GW-C device connected to the mobility management entity and the broadcast/multicast service center, and a GW-U device connected to the base station and the broadcast/multicast service center. The GW-C device connects to the GW-U device. The method includes performing, by the GW-C device, core network signaling interaction with the broadcast/multicast service center and the mobility management entity and sending, by the GW-C device, a forwarding indication message to the GW-U device. The forwarding indication message is for instructing the GW-U device to process a packet received by the GW-U device The method further includes receiving, by the GW-U device, signaling sent by the base station and sending the signaling to the GW-C device according to the forwarding indication message. The method further includes receiving and processing, by the GW-C device, the signaling sent by the GW-U device. The method further includes, in a data transmission procedure, receiving, by the GW-U device, a broadcast/multicast service data packet sent by the broadcast/multicast service center, and sending the broadcast/multicast service data packet to the base station according to the forwarding indication message.

In a first possible implementation of the second aspect, the performing, by the GW-C device, core network signaling interaction with the broadcast/multicast service center and the mobility management entity includes, in a session establishment procedure, receiving, by the GW-C device, a first session start request message sent by the broadcast/multicast service center and sending, by the GW-C device, a second session start request message to the mobility management entity. The first session start request message is for establishing a bearer between the GW-U device and the broadcast/multicast service center, and the second session start request message is for establishing a bearer between the base station and the GW-U device.

With reference to the second aspect or the first possible implementation of the second aspect, in a second possible implementation, the GW-U device connects to the broadcast/multicast service center using an SGi-mb interface, and the method further includes allocating, when a sending manner on the SGi-mb interface is a unicast manner, by the GW-C device a destination UDP port corresponding to the SGi-mb interface.

With reference to any possible implementation of the second aspect, or the first to the second possible implementations of the second aspect, in a third possible implementation, the GW-U device connects to the broadcast/multicast service center using an SGi-mb interface, and the method further includes sending, when a sending manner on the SGi-mb interface is a multicast manner, by the GW-C device a multicast group join instruction message to the GW-U device. The multicast group join instruction message includes a first multicast group join request message and is for instructing the GW-U device to send the first multicast group join request message to the broadcast/multicast service center. The method further includes sending, by the GW-U device, the first multicast group join request message to the broadcast/multicast service center and adding, by the broadcast/multicast service center according to the first multicast group join request message, the GW-U device into an IP multicast group using the broadcast/multicast service center as a source point.

With reference to any possible implementation of the second aspect, or the first to the third possible implementations of the second aspect, in a fourth possible implementation, the GW-U device connects to the base station using an M1 interface, and the method further includes allocating, by the GW-C device, an IP multicast address of the M1 interface and a tunnel identifier. The IP multicast address is for identifying an IP multicast group using the GW-U device as a source point.

With reference to any possible implementation of the second aspect, or the first to the fourth possible implementations of the second aspect, in a fifth possible implementation, the forwarding indication message includes a first forwarding rule. The first forwarding rule is used when the GW-U device processes the signaling sent by the base station to the GW-U device. Receiving, by the GW-U device, signaling sent by the base station, and sending the signaling to the GW-C device according to the forwarding indication message includes receiving, by the GW-U device, a second multicast group join request message sent by the base station, preprocessing the second multicast group join request message according to the first forwarding rule, and sending a preprocessed second multicast group join request message to the GW-C device. Receiving and processing, by the GW-C device, the signaling sent by the GW-U device includes adding, after receiving the preprocessed second multicast group join request message, by the GW-C device according to the preprocessed second multicast group join request message, the base station into the IP multicast group using the GW-U device as the source point.

With reference to any possible implementation of the second aspect, or the first to the fifth possible implementations of the second aspect, in a sixth possible implementation, the forwarding indication message includes a second forwarding rule. The second forwarding rule is used when the GW-U device processes the packet sent by the broadcast/multicast service center to the GW-U device. Sending, by the GW-U device, the broadcast/multicast service data packet to the base station according to the forwarding indication message includes sending, by the GW-U device, the broadcast/multicast service data packet to the base station according to the second forwarding rule.

With reference to any possible implementation of the second aspect, or the first to the sixth possible implementations of the second aspect, in a seventh possible implementation, performing, by the GW-C device, core network signaling interaction with the broadcast/multicast service center includes, in a session termination procedure, receiving by the GW-C device a first session termination request message sent by the broadcast/multicast service center, the first session termination request message including specified time information, and releasing by the GW-C device a bearer context at a moment specified by the specified time information.

With reference to any possible implementation of the second aspect, or the first to the seventh possible implementations of the second aspect, in an eighth possible implementation, sending, by the GW-C device, a forwarding indication message to the GW-U device includes sending by the GW-C device the forwarding indication message to the GW-U device at the moment specified by the specified time information. The forwarding indication message includes a rule deletion instruction. The method further includes deleting, by the GW-U device according to the rule deletion instruction, a second forwarding rule used when the GW-U device processes the broadcast/multicast service data packet.

With reference to any possible implementation of the second aspect, or the first to the eighth possible implementations of the second aspect, in a ninth possible implementation, performing, by the GW-C device, core network signaling interaction with the mobility management entity includes sending, by the GW-C device, a second session termination request message to the mobility management entity. The second session termination request message includes the specified time information, such that the mobility management entity sends the specified time information to the base station, and the base station releases the bearer context according to the specified time information.

With reference to any possible implementation of the second aspect, or the first to the ninth possible implementations of the second aspect, in a tenth possible implementation, receiving, by the GW-U device, signaling sent by the base station, and sending the signaling to the GW-C device according to the first forwarding rule includes receiving, by the GW-U device, a first multicast group removal request message sent by the base station, preprocessing the first multicast group removal request message according to a first forwarding rule of the GW-U device, and sending a preprocessed first multicast group removal request message to the GW-C device Receiving and processing, by the GW-C device, the signaling includes removing, after receiving the preprocessed first multicast group removal request message, by the GW-C device according to the preprocessed first multicast group removal request message, the base station from the IP multicast group using the GW-U device as the source point.

With reference to any possible implementation of the second aspect, or the first to the tenth possible implementations of the second aspect, in an eleventh possible implementation, if the sending manner on the SGi-mb interface between the broadcast/multicast service center and the gateway user plane device is the multicast manner, the method further includes sending a multicast group removal instruction message to the GW-U device. The multicast group removal instruction message includes a second multicast group removal request message and is for instructing the GW-U device to send the second multicast group removal request message to the broadcast/multicast service center. The method further includes sending, by the GW-U device, the second multicast group removal request message to the broadcast/multicast service center. The second multicast group removal request message is for instructing the broadcast/multicast service center to remove the GW-U device from the IP multicast group using the broadcast/multicast service center as the source point.

According to a third aspect, an eMBMS system management method includes performing, by a GW-C device, core network signaling interaction with a broadcast/multicast service center and a mobility management entity and sending a forwarding indication message to a GW-U device. The forwarding indication message is for instructing the GW-U device to process a packet received by the GW-U device. The method further includes receiving and processing signaling sent by the GW-U device according to the forwarding indication message. The signaling is sent by the base station to the GW-U device.

In a first possible implementation of the third aspect, performing, by the GW-C device, core network signaling interaction with a broadcast/multicast service center and a mobility management entity includes, in a session establishment procedure, receiving a first session start request message sent by the broadcast/multicast service center and sending a second session start request message to the mobility management entity. The first session start request message is for establishing a bearer between the GW-U device and the broadcast/multicast service center, and the second session start request message is for establishing a bearer between the base station and the GW-U device.

With reference to the third aspect or the first possible implementation of the third aspect, in a second possible implementation, the GW-U device connects to the broadcast/multicast service center using an SGi-mb interface, and the method further includes allocating, when a sending manner on the SGi-mb interface is a unicast manner, a destination UDP port corresponding to the SGi-mb interface.

With reference to any possible implementation of the third aspect, or the first to the second possible implementations of the third aspect, in a third possible implementation, the GW-U device connects to the broadcast/multicast service center using an SGi-mb interface, and the method further includes sending, when a sending manner on the SGi-mb interface is a multicast manner, a multicast group join instruction message to the GW-U device. The multicast group join instruction message includes a first multicast group join request message and is for instructing the GW-U device to send the first multicast group join request message to the broadcast/multicast service center.

With reference to any possible implementation of the third aspect, or the first to the third possible implementations of the third aspect, in a fourth possible implementation, the GW-U device connects to the base station using an M1 interface, and the method further includes allocating an IP multicast address of the M1 interface and a tunnel identifier. The IP multicast address is for identifying an IP multicast group using the GW-U device as a source point.

With reference to any possible implementation of the third aspect, or the first to the fourth possible implementations of the third aspect, in a fifth possible implementation, the forwarding indication message includes a first forwarding rule, and the first forwarding rule is used when the GW-U device processes the signaling sent by the base station to the GW-U device. Receiving and processing signaling sent by the GW-U device according to the forwarding indication message includes receiving a preprocessed second multicast group join request message sent by the GW-U device. The preprocessed second multicast group join request message is obtained after the GW-U device preprocesses, according to the first forwarding rule, a second multicast group join request message sent by the base station. Receiving and processing signaling sent by the GW-U device according to the forwarding indication message further includes adding, according to the preprocessed second multicast group join request message, the base station into the IP multicast group using the GW-U device as the source point.

With reference to any possible implementation of the third aspect, or the first to the fifth possible implementations of the third aspect, in a sixth possible implementation, performing, by the GW-C device, core network signaling interaction with a broadcast/multicast service center includes, in a session termination procedure, receiving a first session termination request message sent by the broadcast/multicast service center, the first session termination request message including specified time information, and releasing a bearer context at a moment specified by the specified time information.

With reference to any possible implementation of the third aspect, or the first to the sixth possible implementations of the third aspect, in a seventh possible implementation, sending a forwarding indication message to the GW-U device includes sending the forwarding indication message to the GW-U device at the moment specified by the specified time information. The forwarding indication message includes a rule deletion instruction, such that the GW-U device deletes, according to the rule deletion instruction, a second forwarding rule used when the GW-U device processes a broadcast/multicast service data packet.

With reference to any possible implementation of the third aspect, or the first to the seventh possible implementations of the third aspect, in an eighth possible implementation, performing, by the GW-C device, core network signaling interaction with a mobility management entity includes sending a second session termination request message to the mobility management entity. The second session termination request message includes the specified time information, such that the mobility management entity sends the specified time information to the base station, and the base station releases the bearer context according to the specified time information.

With reference to any possible implementation of the third aspect, or the first to the eighth possible implementations of the third aspect, in a ninth possible implementation, receiving and processing signaling sent by the GW-U device according to the forwarding indication message includes receiving a preprocessed first multicast group removal request message. The preprocessed first multicast group removal request message is obtained after the GW-U device preprocesses, according to a first forwarding rule, a first multicast group removal request message sent by the base station. Receiving and processing signaling sent by the GW-U device according to the forwarding indication message further includes removing, according to the preprocessed first multicast group removal request message, the base station from the IP multicast group using the GW-U device as the source point.

With reference to any possible implementation of the third aspect, or the first to the ninth possible implementations of the third aspect, in a tenth possible implementation, if the sending manner on the SGi-mb interface between the broadcast/multicast service center and the gateway user plane device is the multicast manner, the method further includes sending a multicast group removal instruction message to the GW-U device. The multicast group removal instruction message includes a second multicast group removal request message and is for instructing the GW-U device to send the second multicast group removal request message to the broadcast/multicast service center. The second multicast group removal request message is for instructing the broadcast/multicast service center to remove the GW-U device from an IP multicast group using the broadcast/multicast service center as a source point.

According to a fourth aspect, a GW-C device includes a first interaction unit, a second interaction unit, and a third interaction unit. The first interaction unit is configured to perform core network signaling interaction with a broadcast/multicast service center. The second interaction unit is configured to perform core network signaling interaction with a mobility management entity. The third interaction unit is configured to send a forwarding indication message to a gateway user plane GW-U device. The forwarding indication message is for instructing the GW-U device to process a packet received by the GW-U device. The third interaction unit is further configured to receive and process signaling sent by the GW-U device according to the forwarding indication message. The signaling is sent by the base station to the GW-U device.

In a first possible implementation of the fourth aspect, the first interaction unit is configured to receive, in a session establishment procedure, a first session start request message sent by the broadcast/multicast service center, and the second interaction unit is configured to send a second session start request message to the mobility management entity. The first session start request message is for establishing a bearer between the GW-U device and the broadcast/multicast service center, and the second session start request message is for establishing a bearer between the base station and the GW-U device.

With reference to the fourth aspect or the first possible implementation of the fourth aspect, in a second possible implementation, the GW-U device connects to the broadcast/multicast service center using an SGi-mb interface, and the GW-C device further includes an allocation unit configured to allocate, when a sending manner on the SGi-mb interface is a unicast manner, a destination UDP port corresponding to the SGi-mb interface.

With reference to any possible implementation of the fourth aspect, or the first to the second possible implementations of the fourth aspect, in a third possible implementation, the GW-U device connects to the broadcast/multicast service center using an SGi-mb interface, and the third interaction unit is further configured to send, when a sending manner on the SGi-mb interface is a multicast manner, a multicast group join instruction message to the GW-U device. The multicast group join instruction message includes a first multicast group join request message and is for instructing the GW-U device to send the first multicast group join request message to the broadcast/multicast service center.

With reference to any possible implementation of the fourth aspect, or the first to the third possible implementations of the fourth aspect, in a fourth possible implementation, the GW-U device connects to the base station using an M1 interface, and the allocation unit is configured to allocate an IP multicast address of the M1 interface and a tunnel identifier. The IP multicast address is for identifying an IP multicast group using the GW-U device as a source point.

With reference to any possible implementation of the fourth aspect, or the first to the fourth possible implementations of the fourth aspect, in a fifth possible implementation, the forwarding indication message includes a first forwarding rule, and the first forwarding rule is used when the GW-U device processes the signaling sent by the base station to the GW-U device. The third interaction unit is configured to receive a preprocessed second multicast group join request message sent by the GW-U device. The preprocessed second multicast group join request message is obtained after the GW-U device preprocesses, according to the first forwarding rule, a second multicast group join request message sent by the base station. The GW-C device further includes a multicast management unit configured to add, according to the preprocessed second multicast group join request message, the base station into the IP multicast group using the GW-U device as the source point.

With reference to any possible implementation of the fourth aspect, or the first to the fifth possible implementations of the fourth aspect, in a sixth possible implementation, the first interaction unit is further configured to receive, in a session termination procedure, a first session termination request message sent by the broadcast/multicast service center. The first session termination request message includes specified time information. The GW-C device further includes a bearer release unit configured to release a bearer context at a moment specified by the specified time information.

With reference to any possible implementation of the fourth aspect, or the first to the sixth possible implementations of the fourth aspect, in a seventh possible implementation, the third interaction unit is configured to send the forwarding indication message to the GW-U device at the moment specified by the specified time information. The forwarding indication message includes a rule deletion instruction, such that the GW-U device deletes, according to the rule deletion instruction, a second forwarding rule used when the GW-U device processes a broadcast/multicast service data packet.

With reference to any possible implementation of the fourth aspect, or the first to the seventh possible implementations of the fourth aspect, in an eighth possible implementation, the second interaction unit is further configured to send a second session termination request message to the mobility management entity. The second session termination request message includes the specified time information, such that the mobility management entity sends the specified time information to the base station, and the base station releases the bearer context according to the specified time information.

With reference to any possible implementation of the fourth aspect, or the first to the ninth possible implementations of the fourth aspect, in a tenth possible implementation, the third interaction unit is further configured to receive a preprocessed first multicast group removal request message. The preprocessed first multicast group removal request message is obtained after the GW-U device preprocesses, according to a first forwarding rule, a first multicast group removal request message sent by the base station. The GW-C device further includes a multicast management unit configured to remove, according to the preprocessed first multicast group removal request message, the base station from the IP multicast group using the GW-U device as the source point.

With reference to any possible implementation of the fourth aspect, or the first to the tenth possible implementations of the fourth aspect, in an eleventh possible implementation, if the sending manner on the SGi-mb interface between the broadcast/multicast service center and the gateway user plane device is the multicast manner, the third interaction unit is further configured to send a multicast group removal instruction message to the GW-U device. The multicast group removal instruction message includes a second multicast group removal request message and is for instructing the GW-U device to send the second multicast group removal request message to the broadcast/multicast service center. The second multicast group removal request message is for instructing the broadcast/multicast service center to remove the GW-U device from an IP multicast group using the broadcast/multicast service center as a source point.

According to a fifth aspect, another GW-C device includes a processor, a communications interface, a memory, and a communications bus. The processor, the communications interface, and the memory communicate with each other using the communications bus. The memory is configured to store program code. The processor invokes the program code stored in the memory to implement operations that include performing core network signaling interaction with a broadcast/multicast service center and a mobility management entity. The operations further include sending a forwarding indication message to a gateway user plane GW-U device. The forwarding indication message is for instructing the GW-U device to process a packet received by the GW-U device. The operations further include receiving and processing signaling sent by the GW-U device according to the forwarding indication message. The signaling is sent by the base station to the GW-U device.

In a first possible implementation of the fifth aspect, the operations further include, in a session establishment procedure, receiving a first session start request message sent by the broadcast/multicast service center and sending a second session start request message to the mobility management entity. The first session start request message is for establishing a bearer between the GW-U device and the broadcast/multicast service center, and the second session start request message is for establishing a bearer between the base station and the GW-U device.

With reference to the fifth aspect or the first possible implementation of the fifth aspect, in a second possible implementation, the GW-U device connects to the broadcast/multicast service center using an SGi-mb interface, and the operations further include allocating, when a sending manner on the SGi-mb interface is a unicast manner, a destination UDP port corresponding to the SGi-mb interface.

With reference to any possible implementation of the fifth aspect, or the first to the second possible implementations of the fifth aspect, in a third possible implementation, the GW-U device connects to the broadcast/multicast service center using an SGi-mb interface, and the operations further include sending, when a sending manner on the SGi-mb interface is a multicast manner, a multicast group join instruction message to the GW-U device. The multicast group join instruction message includes a first multicast group join request message and is for instructing the GW-U device to send the first multicast group join request message to the broadcast/multicast service center.

With reference to any possible implementation of the fifth aspect, or the first to the third possible implementations of the fifth aspect, in a fourth possible implementation, the GW-U device connects to the base station using an M1 interface, and the operations further include allocating an IP multicast address of the M1 interface and a tunnel identifier. The IP multicast address is for identifying an IP multicast group using the GW-U device as a source point.

With reference to any possible implementation of the fifth aspect, or the first to the fourth possible implementations of the fifth aspect, in a fifth possible implementation, the forwarding indication message includes a first forwarding rule, and the first forwarding rule is used when the GW-U device processes the signaling sent by the base station to the GW-U device. The operations further include receiving a preprocessed second multicast group join request message sent by the GW-U device. The preprocessed second multicast group join request message is obtained after the GW-U device preprocesses, according to the first forwarding rule, a second multicast group join request message sent by the base station. The operations further include adding, according to the preprocessed second multicast group join request message, the base station into the IP multicast group using the GW-U device as the source point.

With reference to any possible implementation of the fifth aspect, or the first to the fifth possible implementations of the fifth aspect, in a sixth possible implementation, the operations further include, in a session termination procedure, receiving a first session termination request message sent by the broadcast/multicast service center, where the first session termination request message including specified time information, and releasing a bearer context at a moment specified by the specified time information.

With reference to any possible implementation of the fifth aspect, or the first to the sixth possible implementations of the fifth aspect, in a seventh possible implementation, the operations further include sending the forwarding indication message to the GW-U device at the moment specified by the specified time information. The forwarding indication message includes a rule deletion instruction, such that the GW-U device deletes, according to the rule deletion instruction, a second forwarding rule used when the GW-U device processes a broadcast/multicast service data packet.

With reference to any possible implementation of the fifth aspect, or the first to the seventh possible implementations of the fifth aspect, in an eighth possible implementation, the operations further include sending a second session termination request message to the mobility management entity. The second session termination request message includes the specified time information, such that the mobility management entity sends the specified time information to the base station, and the base station releases the bearer context according to the specified time information.

With reference to any possible implementation of the fifth aspect, or the first to the eighth possible implementations of the fifth aspect, in a ninth possible implementation, the operations further include receiving a preprocessed first multicast group removal request message. The preprocessed first multicast group removal request message is obtained after the GW-U device preprocesses, according to a first forwarding rule, a first multicast group removal request message sent by the base station. The operations further include removing, according to the preprocessed first multicast group removal request message, the base station from the IP multicast group using the GW-U device as the source point.

With reference to any possible implementation of the fifth aspect, or the first to the ninth possible implementations of the fifth aspect, in a tenth possible implementation, if the sending manner on the SGi-mb interface between the broadcast/multicast service center and the gateway user plane device is the multicast manner, the operations further include sending a multicast group removal instruction message to the GW-U device. The multicast group removal instruction message includes a second multicast group removal request message and is for instructing the GW-U device to send the second multicast group removal request message to the broadcast/multicast service center. The second multicast group removal request message is for instructing the broadcast/multicast service center to remove the GW-U device from an IP multicast group using the broadcast/multicast service center as a source point.

According to a sixth aspect, an eMBMS system management method includes receiving, by a GW-U device, a forwarding indication message sent by a GW-C device, the forwarding indication message for instructing the GW-U device to process a packet received by the GW-U device. The method further includes receiving signaling sent by a base station and sending the signaling to the GW-C device according to the forwarding indication message. The method further includes, in a data transmission procedure, receiving a broadcast/multicast service data packet sent by a broadcast/multicast service center and sending the broadcast/multicast service data packet to the base station according to the forwarding indication message.

In a first possible implementation of the sixth aspect, the GW-U device connects to the broadcast/multicast service center using an SGi-mb interface, and the method further includes, when a sending manner on the SGi-mb interface is a multicast manner, receiving a multicast group join instruction message sent by the GW-C device to the GW-U device. The multicast group join instruction message includes a first multicast group join request message. The method further include sending the first multicast group join request message to the broadcast/multicast service center, such that the broadcast/multicast service center adds, according to the first multicast group join request message, the GW-U device into an IP multicast group using the broadcast/multicast service center as a source point.

With reference to the first aspect or the first possible implementation of the first aspect, in a second possible implementation, the forwarding indication message includes a first forwarding rule, and the first forwarding rule is used when the GW-U device processes the signaling sent by the base station to the GW-U device. Receiving signaling sent by a base station and sending the signaling to the GW-C device according to the forwarding indication message includes receiving a second multicast group join request message sent by the base station, preprocessing the second multicast group join request message according to the first forwarding rule, and sending a preprocessed second multicast group join request message to the GW-C device, such that the GW-C device adds, according to the preprocessed second multicast group join request message, the base station into an IP multicast group using the GW-U device as a source point.

With reference to any possible implementation of the sixth aspect, or the first to the second possible implementations of the sixth aspect, in a third possible implementation, the forwarding indication message includes a second forwarding rule, and the second forwarding rule is used when the GW-U device processes the packet sent by the broadcast/multicast service center to the GW-U device. Sending the broadcast/multicast service data packet to the base station according to the forwarding indication message includes sending the broadcast/multicast service data packet to the base station according to the second forwarding rule.

With reference to any possible implementation of the sixth aspect, or the first to the third possible implementations of the sixth aspect, in a fourth possible implementation, the forwarding indication message includes a rule deletion instruction, and the method further includes deleting, according to the rule deletion instruction, a second forwarding rule used when the GW-U device processes the broadcast/multicast service data packet.

With reference to any possible implementation of the sixth aspect, or the first to the fourth possible implementations of the sixth aspect, in a fifth possible implementation, receiving signaling sent by a base station, and sending the signaling to the GW-C device according to the forwarding indication message includes receiving a first multicast group removal request message sent by the base station, preprocessing the first multicast group removal request message according to a first forwarding rule, and sending a preprocessed first multicast group removal request message to the GW-C device, such that the GW-C device removes, according to the preprocessed first multicast group removal request message, the base station from an IP multicast group using the GW-U device as a source point.

With reference to any possible implementation of the sixth aspect, or the first to the fifth possible implementations of the sixth aspect, in a sixth possible implementation, if the sending manner on the SGi-mb interface between the broadcast/multicast service center and the gateway user plane device is the multicast manner, the method further includes receiving a multicast group removal instruction message sent by the GW-C device to the GW-U device, the multicast group removal instruction message including a second multicast group removal request message, and sending the second multicast group removal request message to the broadcast/multicast service center. The second multicast group removal request message is for instructing the broadcast/multicast service center to remove the GW-U device from the IP multicast group using the broadcast/multicast service center as the source point.

According to a seventh aspect, a GW-U device includes a first interation unit, a second interaction unit, and a third interaction unit. The first interaction unit is configured to receive a forwarding indication message sent by a GW-C device, the forwarding indication message for instructing the GW-U device to process a packet received by the GW-U device. The second interaction unit is configured to receive signaling sent by a base station. The first interaction unit is further configured to send the signaling to the GW-C device according to the forwarding indication message. The third interaction unit is configured to receive, in a data transmission procedure, a broadcast/multicast service data packet sent by a broadcast/multicast service center. The second interaction unit is further configured to send the broadcast/multicast service data packet to the base station according to the forwarding indication message.

In a first possible implementation of the seventh aspect, the GW-U device connects to the broadcast/multicast service center using an SGi-mb interface, and the first interaction unit is further configured to receive, when a sending manner on the SGi-mb interface is a multicast manner, a multicast group join instruction message sent by the GW-C device to the GW-U device. The multicast group join instruction message includes a first multicast group join request message. The third interaction unit is further configured to send the first multicast group join request message to the broadcast/multicast service center, such that the broadcast/multicast service center adds, according to the first multicast group join request message, the GW-U device into an IP multicast group using the broadcast/multicast service center as a source point.

With reference to the seventh aspect or the first possible implementation of the seventh aspect, in a second possible implementation, the forwarding indication message includes a first forwarding rule, and the first forwarding rule is used when the GW-U device processes the signaling sent by the base station to the GW-U device. The second interaction unit is configured to receive a second multicast group join request message sent by the base station The first interaction unit is configured to preprocess the second multicast group join request message according to the first forwarding rule and send a preprocessed second multicast group join request message to the GW-C device, such that the GW-C device adds, according to the preprocessed second multicast group join request message, the base station into an IP multicast group using the GW-U device as a source point.

With reference to any possible implementation of the seventh aspect, or the first to the second possible implementations of the seventh aspect, in a third possible implementation, the forwarding indication message includes a second forwarding rule, and the second forwarding rule is used when the GW-U device processes the packet sent by the broadcast/multicast service center to the GW-U device. The second interaction unit is configured to send the broadcast/multicast service data packet to the base station according to the second forwarding rule.

With reference to any possible implementation of the seventh aspect, or the first to the third possible implementations of the seventh aspect, in a fourth possible implementation, the forwarding indication message includes a rule deletion instruction and the GW-U device further includes a rule deletion unit that is configured to delete, according to the rule deletion instruction, a second forwarding rule used when the GW-U device processes the broadcast/multicast service data packet.

With reference to any possible implementation of the seventh aspect, or the first to the fourth possible implementations of the seventh aspect, in a fifth possible implementation, the second interaction unit is further configured to receive a first multicast group removal request message sent by the base station. The first interaction unit is further configured to preprocess the first multicast group removal request message according to a first forwarding rule and send a preprocessed first multicast group removal request message to the GW-C device, such that the GW-C device removes, according to the preprocessed first multicast group removal request message, the base station from an IP multicast group using the GW-U device as a source point.

With reference to any possible implementation of the seventh aspect, or the first to the fifth possible implementations of the seventh aspect, in a sixth possible implementation, if the sending manner on the SGi-mb interface between the broadcast/multicast service center and the gateway user plane device is the multicast manner, the first interaction unit is further configured to receive a multicast group removal instruction message sent by the GW-C device to the GW-U device. The multicast group removal instruction message includes a second multicast group removal request message. The third interaction unit is further configured to send the second multicast group removal request message to the broadcast/multicast service center. The second multicast group removal request message is for instructing the broadcast/multicast service center to remove the GW-U device from the IP multicast group using the broadcast/multicast service center as the source point.

According to an eighth aspect, another GW-U device includes a processor, a communications interface, a memory, and a communications bus. The processor, the communications interface, and the memory communicate with each other using the communications bus. The memory is configured to store program code. The processor invokes the program code stored in the memory, to implement operations that include receiving a forwarding indication message sent by a GW-C device, the forwarding indication message for instructing the GW-U device to process a packet received by the GW-U device. The operations further include receiving signaling sent by a base station and sending the signaling to the GW-C device according to the forwarding indication message. The operations further include, in a data transmission procedure, receiving a broadcast/multicast service data packet sent by a broadcast/multicast service center and sending the broadcast/multicast service data packet to the base station according to the forwarding indication message.

In a first possible implementation of the eighth aspect, the GW-U device connects to the broadcast/multicast service center using an SGi-mb interface, and operations further include, when a sending manner on the SGi-mb interface is a multicast manner, receiving a multicast group join instruction message sent by the GW-C device to the GW-U device, the multicast group join instruction message including a first multicast group join request message, and sending the first multicast group join request message to the broadcast/multicast service center, such that the broadcast/multicast service center adds, according to the first multicast group join request message, the GW-U device into an IP multicast group using the broadcast/multicast service center as a source point.

With reference to the eighth aspect or the first possible implementation of the eighth aspect, in a second possible implementation, the forwarding indication message includes a first forwarding rule that is used when the GW-U device processes the signaling sent by the base station to the GW-U device. The operations further include receiving a second multicast group join request message sent by the base station, preprocessing the second multicast group join request message according to the first forwarding rule, and sending a preprocessed second multicast group join request message to the GW-C device, such that the GW-C device adds, according to the preprocessed second multicast group join request message, the base station into an IP multicast group using the GW-U device as a source point.

With reference to any possible implementation of the eighth aspect, or the first to the second possible implementations of the eighth aspect, in a third possible implementation, the forwarding indication message includes a second forwarding rule that is used when the GW-U device processes the packet sent by the broadcast/multicast service center to the GW-U device and the operations further include sending the broadcast/multicast service data packet to the base station according to the second forwarding rule.

With reference to any possible implementation of the eighth aspect, or the first to the third possible implementations of the eighth aspect, in a fourth possible implementation, the forwarding indication message includes a rule deletion instruction and the operations further include deleting, according to the rule deletion instruction, a second forwarding rule used when the GW-U device processes the broadcast/multicast service data packet.

With reference to any possible implementation of the eighth aspect, or the first to the fourth possible implementations of the eighth aspect, in a fifth possible implementation, the operations further include receiving a first multicast group removal request message sent by the base station, preprocessing the first multicast group removal request message according to a first forwarding rule, and sending a preprocessed first multicast group removal request message to the GW-C device, such that the GW-C device removes, according to the preprocessed first multicast group removal request message, the base station from an IP multicast group using the GW-U device as a source point.

With reference to any possible implementation of the eighth aspect, or the first to the fifth possible implementations of the eighth aspect, in a sixth possible implementation, if the sending manner on the SGi-mb interface between the broadcast/multicast service center and the gateway user plane device is the multicast manner, the operations further include receiving a multicast group removal instruction message sent by the GW-C device to the GW-U device, the multicast group removal instruction message including a second multicast group removal request message, and sending the second multicast group removal request message to the broadcast/multicast service center. The second multicast group removal request message is for instructing the broadcast/multicast service center to remove the GW-U device from the IP multicast group using the broadcast/multicast service center as the source point.

According to certain examples of the foregoing embodiments, the eMBMS system includes the broadcast/multicast service center, the base station, the mobility management entity connected to the base station, the GW-C device connected to the mobility management entity and the broadcast/multicast service center, and the GW-U device connected to the base station and the broadcast/multicast service center. The GW-C device is configured to perform core network signaling interaction with the broadcast/multicast service center and the mobility management entity, and to send the forwarding indication message to the GW-U device. The forwarding indication message is for instructing the GW-U device to process the packet received by the GW-U device. The GW-U device is configured to receive the signaling sent by the base station, and to send the signaling to the GW-C device according to the forwarding indication message. The GW-C device is further configured to receive and process the signaling sent by the GW-U device. The GW-U device is further configured to, in the data transmission procedure, receive the broadcast/multicast service data packet sent by the broadcast/multicast service center and send the broadcast/multicast service data packet to the base station according to the forwarding indication message.

In this way, the GW-U device and the GW-C device may be two separate devices, the GW-C device being responsible for processing all session-related signaling, and the GW-U device being responsible for receiving and forwarding, in the data transmission procedure, the broadcast/multicast service data packet sent by the broadcast/multicast service center. Therefore, in certain embodiments, after a new function is added into or a new service is deployed in the GW-C device, the GW-U device does not need to be modified, allowing the GW-C device and the GW-U device to independently evolve.

BRIEF DESCRIPTION OF THE DRAWINGS

To describe the technical solutions in embodiments of the present disclosure more clearly, the following briefly describes the accompanying drawings used for describing the embodiments. The accompanying drawings in the following description show merely some embodiments of the present disclosure.

DETAILED DESCRIPTION OF ILLUSTRATIVE EMBODIMENTS

To make the objectives, technical solutions, and advantages of embodiments of the present disclosure clearer, the following describes the technical solutions in embodiments of the present disclosure with reference to the accompanying drawings. The described embodiments are some but not all of the embodiments of the present disclosure.

To help a person skilled in the art understand the solutions, technical terms used in the present disclosure are first described:

A Multimedia Broadcast and Multicast Service (MBMS) is a mobile device multimedia technical solution that is based on a mobile communications system and that is proposed by the $3^{rd}$ Generation Partnership Project (3GPP). An eMBMS system provided by Long Term Evolution (LTE) supports an evolved multimedia broadcast/multicast service, and the evolved multimedia broadcast/multicast service can provide streaming media of higher quality and a timely broadcast service.

Figure 1:
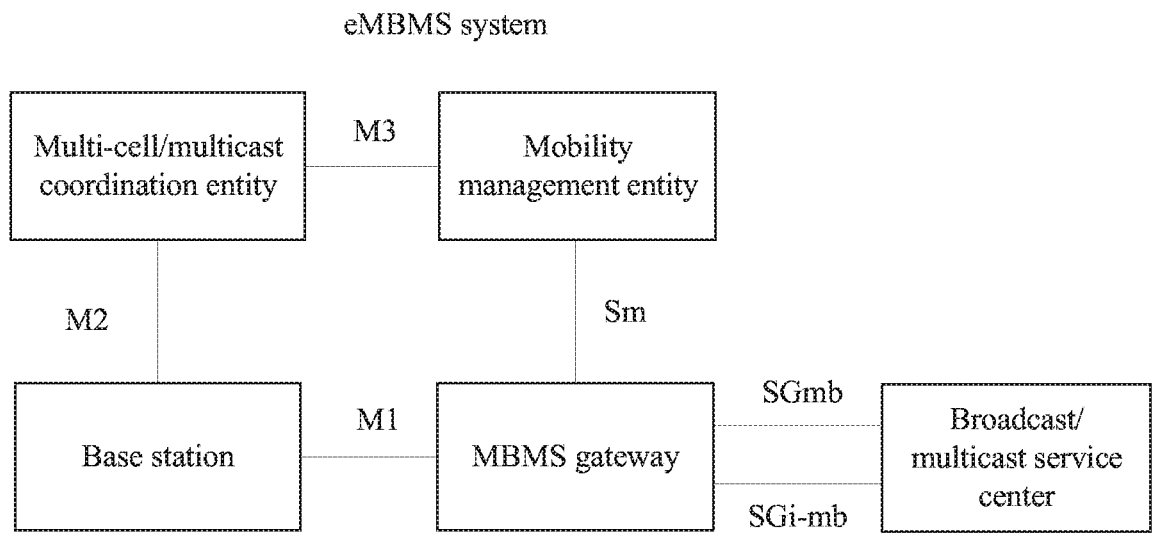
FIG. 1 is a schematic structural diagram of an existing eMBMS system according to the present disclosure.

A network architecture diagram of the eMBMS system is shown in FIG. 1. It should be noted that a multi-cell/multicast coordination entity in the eMBMS system is a logical entity, and may independently exist in the eMBMS system, or may be integrated into another entity network element such as a base station. The multi-cell/multicast coordination entity is mainly configured to allocate radio resources used by all base stations in a same multimedia broadcast multicast service single frequency network (MBSFN) area.

A mobility management entity in the eMBMS system is configured to provide a control plane function used when an evolved universal terrestrial radio access network (E-UTRAN) accesses a core network. The E-UTRAN may include the base station and the multi-cell/multicast coordination entity. Interaction between the mobility management entity and the base station that is described below may be considered as interaction between the mobility management entity and the E-UTRAN.

Software-defined networking (SDN) is a network architecture, can decouple a control function from a forwarding function, and has characteristics of centralized control and open programming interface.

The OpenFlow protocol is an interface protocol between a gateway control plane device and a gateway user plane device in an SDN architecture, and is intended to resolve various bottlenecks generated when a current network faces a new service.

Embodiment 1

Figure 2:
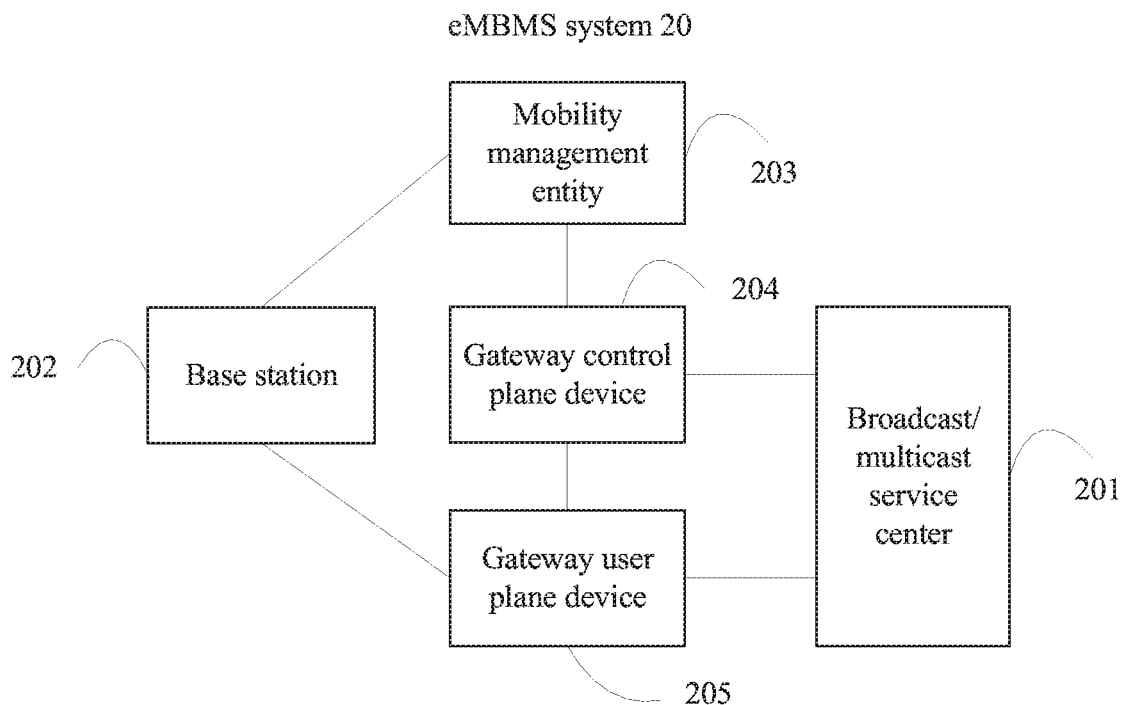
FIG. 2 is a schematic structural diagram of an eMBMS system according to an embodiment of the present disclosure.

This embodiment of the present disclosure provides an eMBMS system 20. As shown in FIG. 2, the eMBMS system 20 includes a broadcast/multicast service center 201, a base station 202, a mobility management entity 203 connected to base station 202, a gateway control plane (GW-C) device 204 connected to mobility management entity 203 and broadcast/multicast service center 201, and a gateway user plane (GW-U) device 205 connected to base station 202 and broadcast/multicast service center 201. GW-C device 204 connects to GW-U device 205.

GW-C device 204 is configured to perform core network signaling interaction with broadcast/multicast service center 201 and mobility management entity 203.

GW-C device 204 is further configured to send a forwarding indication message to GW-U device 205. The forwarding indication message is used to instruct GW-U device 205 to process a packet received by GW-U device 205.

GW-U device 205 is configured to receive signaling sent by base station 202 and send the signaling to GW-C device 204 according to the forwarding indication message.

GW-C device 204 is further configured to receive and process the signaling sent by GW-U device 205.

GW-U device 205 is further configured to, in a data transmission procedure, receive a broadcast/multicast service data packet sent by broadcast/multicast service center 201, and send the broadcast/multicast service data packet to base station 202 according to the forwarding indication message.

It should be noted that mobility management entity 203, GW-C device 204, GW-U device 205, and broadcast/multicast service center 201 are functional entities in a core network, and base station 202 is a functional entity in an access network. In this way, core network signaling includes signaling exchanged between functional entities in the core network. The signaling sent by base station 202 to GW-U device 205 includes a message for requesting to join an IP multicast group and a message for requesting to exit an IP multicast group.

In addition, although a multi-cell/multicast coordination entity is not shown in FIG. 2, a person skilled in the art would understand that the multi-cell/multicast coordination entity may be disposed in a physical entity together with base station 202, or may be individually disposed. For details, refer to the description of the technical terms at the beginning of the specification.

In this way, GW-U device 205 and GW-C device 204 may be two separate devices, the GW-C device being responsible for processing all session-related signaling, and the GW-U device being responsible for receiving and forwarding, in the data transmission procedure, the broadcast/multicast service data packet sent by the broadcast/multicast service center. Therefore, after a new function is added into or a new service is deployed in GW-C device 204, GW-U device 205 does not need to be modified, allowing GW-C device 204 and GW-U device 205 to independently evolve.

To assist a person skilled in the art in understanding the eMBMS system provided in embodiments of the present disclosure more easily, the following describes the functional entities in the eMBMS system in greater detail.

First, as shown in FIG. 1, in an existing eMBMS system, an SGmb interface is an interface between a broadcast/multicast service center and an MBMS gateway control plane, and is responsible for transiting signaling between the broadcast/multicast service center and the MBMS gateway control plane. An SGi-mb interface is an interface between the broadcast/multicast service center and an MBMS gateway user plane, and is responsible for receiving a broadcast/multicast service data packet from the broadcast/multicast service center.

Figure 3:
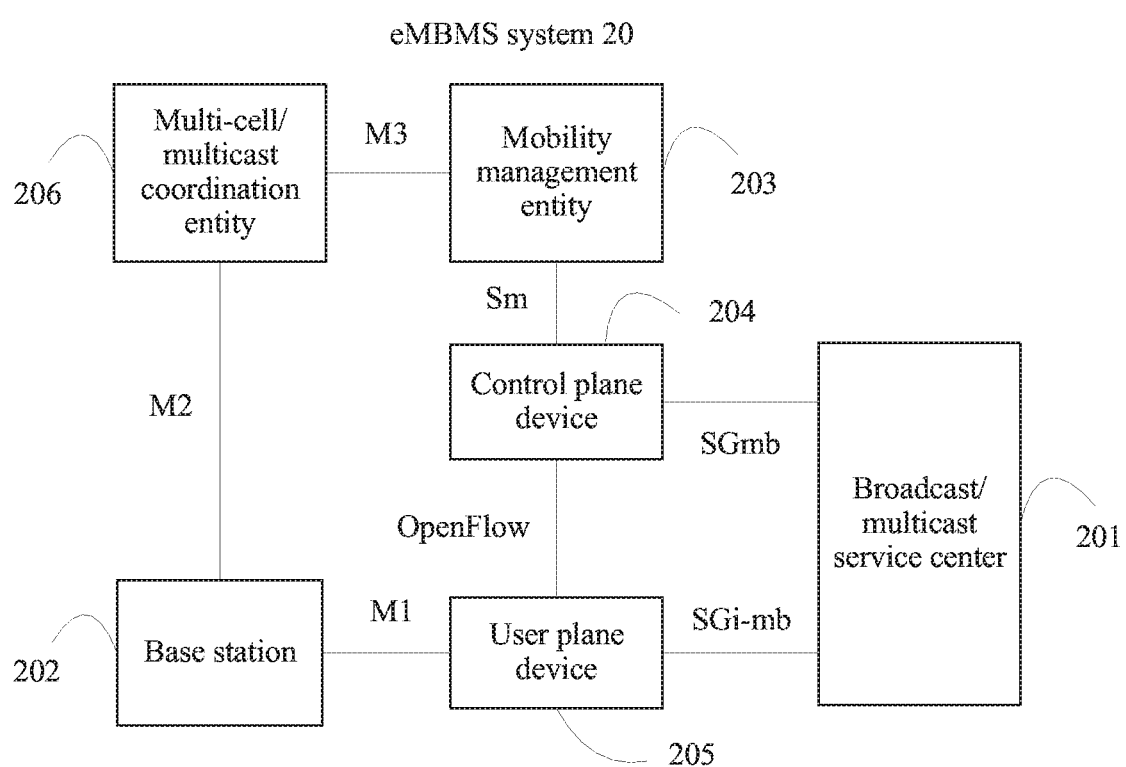
FIG. 3 is a schematic structural diagram of another eMBMS system according to an embodiment of the present disclosure.

Therefore, a specific connecting structure of the eMBMS system 20 provided in this embodiment of the present disclosure is shown in FIG. 3. FIG. 3 shows an individually-disposed multi-cell/multicast coordination entity 206. GW-C device 204 connects to broadcast/multicast service center 201 using an SGmb interface, GW-U device 205 connects to broadcast/multicast service center 201 using an SGi-mb interface, GW-C device 204 connects to mobility management entity 203 using an Sm interface, GW-U device 205 connects to base station 202 using an M1 interface, and CW-C device 204 connects to gateway user plane device 205 using an OpenFlow interface. It may be learned from the description of the technical terms at the beginning of the specification that GW-C device 204 in the present disclosure may control behavior of GW-U device 205 using the OpenFlow protocol.

Next, it should be noted that a service procedure of the eMBMS system includes a session establishment procedure, a data transmission procedure, and a session termination procedure. The following describes operations of the functional entities in the foregoing three procedures in detail.

Optionally, in the session establishment procedure, GW-C device 204 is configured to receive a first session start request message sent by the broadcast/multicast service center and send a second session start request message to mobility management entity 203. The first session start request message is used to establish a bearer between GW-U device 205 and broadcast/multicast service center 201, and the second session start request message is used to establish a bearer between base station 202 and GW-U device 205.

It should be noted that bearer establishment includes two functional entities creating a bearer context of an MBMS service and storing a session attribute. In this way, before sending the first session start request message, broadcast/multicast service center 201 may establish a bearer context of an MBMS service and send the first session start request message that includes session-related information to GW-C device 204. After receiving the first session start request message, GW-C device 204 establishes the bearer context of the MBMS service according to the first session start request message to complete establishment of the bearer between GW-U device 205 and broadcast/multicast service center 201.

Further, GW-C device 204 sends the second session start request message that includes session-related information to mobility management entity 203, so that mobility management entity 203 sends the session-related information to base station 202. Base station 202 establishes the bearer context of the MBMS service to complete establishment of the bearer between base station 202 and GW-U device 205. The bearer between broadcast/multicast service center 201 and GW-U device 205 and the bearer between GW-U device 205 and base station 202 are used to transmit the broadcast/multicast service data packet.

Optionally, in the session establishment procedure, GW-C device 204 is further configured to allocate, when a sending manner on the SGi-mb interface is a unicast manner, a destination User Datagram Protocol (UDP) port corresponding to the SGi-mb interface.

For example, the first session start request message may further include identification information used to identify the sending manner on the SGi-mb interface. In this way, after receiving the first session start request message, GW-C device 204 may determine the sending manner on the SGi-mb interface according to the identification information. It should be noted that broadcast/multicast service center 201 may send the broadcast/multicast service data packet to GW-U device 205 in a unicast manner or a multicast manner. If the sending manner on the SGi-mb interface is the unicast manner, GW-C device 204 may allocate the destination UDP port corresponding to the SGi-mb interface, so that GW-U device 205 receives, using the UDP port, the broadcast/multicast service data packet sent by broadcast/multicast service center 201.

Optionally, GW-C device 204 is further configured to send, when a sending manner on the SGi-mb interface is a multicast manner, a multicast group join instruction message to GW-U device 205. The multicast group join instruction message includes a first multicast group join request message and is used to instruct GW-U device 205 to send the first multicast group join request message to broadcast/multicast service center 201. GW-U device 205 is further configured to send the first multicast group join request message to broadcast/multicast service center 201. Broadcast/multicast service center 201 is configured to add, according to the first multicast group join request message, GW-U device 205 into an IP multicast group using broadcast/multicast service center 201 as a source point, such that broadcast/multicast service center 201 can send the broadcast/multicast service data packet to GW-U device 205 in a multicast manner.

For example, the OpenFlow protocol is used as an interface protocol between GW-U device 205 and GW-C device 204. GW-C device 204 encapsulates the first multicast group join request message using the OpenFlow protocol to obtain a packet-out message, that is, the multicast group join instruction message. In this way, after receiving the multicast group join instruction message, GW-U device 205 obtains the first multicast group join request message by means of parsing, and sends the first multicast group join request message to broadcast/multicast service center 201 according to an instruction.

Optionally, GW-C device 204 is further configured to allocate an IP multicast address of the M1 interface and a tunnel identifier. The IP multicast address is used to identify an IP multicast group using GW-U device 205 as a source point.

It should be noted that, after receiving the broadcast/multicast service data packet, GW-U device 205 sends the broadcast/multicast service data packet to all base stations 202 in the IP multicast group using GW-U device 205 as the source point. The IP multicast group is marked in a manner of an IP multicast address+a multicast source address, that is, the IP multicast address allocated by GW-C device 204 to the M1 interface is used to mark the IP multicast group.

In addition, it should be noted that an interaction packet between GW-U device 205 and base station 202 may be encapsulated using the GPRS Tunneling Protocol (GTP). The tunnel identifier is a field in the GTP and used to identify a tunnel endpoint.

Optionally, in the session establishment procedure, the forwarding indication message sent by GW-C device 204 to GW-U device 205 includes a first forwarding rule. The first forwarding rule is a rule used when GW-U device 205 processes the signaling sent by base station 202 to GW-U device 205. In the session establishment procedure, the signaling sent by base station 202 to GW-U device 205 includes a second multicast group join request message. GW-U device 205 is configured to receive the second multicast group join request message sent by base station 202, preprocess the second multicast group join request message according to the first forwarding rule, and send a preprocessed second multicast group join request message to GW-C device 204. GW-C device 204 is further configured to add, after receiving the preprocessed second multicast group join request message and according to the preprocessed second multicast group join request message, base station 202 into the IP multicast group using GW-U device 205 as the source point.

As an example, after receiving the first session start request message, GW-C device 204 may send the first forwarding rule to GW-U device 205. The first forwarding rule may indicate a message that needs to be forwarded by GW-U device 205, and preprocessing that needs to be performed by GW-U device 205 on the message.

For example, the message that is indicated by the first forwarding rule and is to be forwarded by GW-U device 205 includes the second multicast group join request message that is sent by base station 202 and used to request to join the IP multicast group, and indicates that preprocessing to be performed by GW-U device 205 on the second multicast group join request message is encapsulating the second multicast group join request message using the OpenFlow protocol to obtain a Packet-in message. The packet-in message includes a port through which GW-U device 205 receives the second multicast group join request message, and the packet-in message is the preprocessed second multicast group join request message.

Optionally, in the session establishment procedure, the forwarding indication message sent by GW-C device 204 to GW-U device 205 may further include a second forwarding rule, and the second forwarding rule is a rule used when GW-U device 205 processes the packet sent by broadcast/multicast service center 201 to GW-U device 205. GW-U device 205 is configured to send the broadcast/multicast service data packet to base station 202 according to the second forwarding rule after receiving the broadcast/multicast service data packet.

For example, the second forwarding rule includes a manner that is indicated by GW-C device 204 and in which GW-U device 205 processes the broadcast/multicast service data packet, and at least one port through which the broadcast/multicast service data packet is output. The at least one port corresponds to at least one base station 202 in the IP multicast group using GW-U device 205 as the source point. In this way, after receiving the broadcast/multicast service data packet, GW-U device 205 processes the broadcast/multicast service data packet according to the processing manner of the second forwarding rule and forwards a processed broadcast/multicast service data packet to the corresponding at least one base station 202 using the at least one port.

It may be learned from the foregoing description that, in the eMBMS system provided in this embodiment of the present disclosure, in the session establishment procedure, related signaling is processed by GW-C device 204, and GW-U device 205 just forwards the related signaling and the broadcast/multicast service data packet according to an instruction of GW-C device 204.

Further, in the session termination procedure, GW-C device 204 is further configured to receive a first session termination request message sent by broadcast/multicast service center 201. The first session termination request message includes specified time information. GW-C device 204 releases a bearer context at a moment specified by the specified time information.

Further, in the session termination procedure, the forwarding indication message sent by GW-C device 204 to GW-U device 205 includes a rule deletion instruction. For example, GW-C device 204 sends the forwarding indication message to GW-U device 205 at the moment specified by the specified time information. GW-U device 205 is further configured to delete, according to the rule deletion instruction, a second forwarding rule used when GW-U device 205 processes the broadcast/multicast service data packet.

Optionally, GW-C device 204 is further configured to send a second session termination request message to mobility management entity 203. The second session termination request message includes the specified time information, so that mobility management entity 203 sends the specified time information to base station 202, and base station 202 releases the bearer context according to the specified time information.

For example, the first session termination request message includes a service termination moment. After receiving the first session termination message, GW-C device 204 sends a second session termination message that includes a session termination moment to mobility management entity 203. After receiving the second session termination message, mobility management entity 203 sends a third session termination message that includes the session termination moment to base station 202. In this way, when the session termination moment arrives, GW-C device 204, mobility management entity 203, and base station 202 may release the bearer context at the same time.

Optionally, in the session termination procedure, GW-U device 205 is further configured to receive a first multicast group removal request message sent by base station 202, preprocess the first multicast group removal request message according to a first forwarding rule, and send a preprocessed first multicast group removal request message to GW-C device 204. GW-C device 204 is further configured to remove, after receiving the preprocessed first multicast group removal request message, and according to the preprocessed first multicast group removal request message, base station 202 from the IP multicast group using GW-U device 205 as the source point.

Optionally, if the sending manner on the SGi-mb interface between broadcast/multicast service center 201 and GW-U device 205 is the multicast manner, in the session termination procedure, GW-C device 204 is further configured to send a multicast group removal instruction message to GW-U device 205. The multicast group removal instruction message includes a second multicast group removal request message and is used to instruct GW-U device 205 to send the second multicast group removal request message to broadcast/multicast service center 201.

GW-U device 205 is further configured to send the second multicast group removal request message to broadcast/multicast service center 201. The second multicast group removal request message is used to instruct broadcast/multicast service center 201 to remove GW-U device 205 from the IP multicast group using broadcast/multicast service center 201 as the source point.

For example, the multicast group removal instruction message sent by GW-C device 204 to GW-U device 205 is a Packet-out message encapsulated using the OpenFlow protocol. The packet-out message may include the second multicast group removal request message and a message forwarding indication. In this way, after receiving the multicast group removal instruction message, GW-U device 205 sends the second multicast group removal request message to broadcast/multicast service center 201 according to the message forwarding indication.

It may be learned from the foregoing description that, at the specified moment, the eMBMS system releases a bearer context of a related device, deletes the second forwarding rule used when GW-U device 205 processes the broadcast/multicast service data packet, and removes base station 202 and GW-U device 205 from corresponding IP multicast groups, so as to terminate a broadcast/multicast service. In addition, in this process, related signaling is processed by GW-U device 205, and GW-C device 204 just forwards the related signaling according to an instruction of the GW-C.

It should be noted that the foregoing describes the network architecture of the eMBMS system provided in this embodiment of the present disclosure, and the operations of GW-C device 204 and GW-U device 205 in the eMBMS system. The operations of GW-C device 204 and GW-U device 205 are not limited by a description sequence, that is, a sequence of the actions executed by GW-C device 204 and the actions executed by GW-U device 205 is not limited in the present disclosure. For a specific service procedure of the eMBMS system provided in this embodiment of the present disclosure, refer to an eMBMS system management method provided in a next embodiment in the specification.

According to the foregoing solutions, the eMBMS system includes broadcast/multicast service center 201, base station 202, mobility management entity 203 connected to base station 202, GW-C device 204 connected to mobility management entity 203 and broadcast/multicast service center 201, and GW-U device 205 connected to base station 202 and broadcast/multicast service center 201. GW-C device 204 is configured to: perform core network signaling interaction with broadcast/multicast service center 201 and mobility management entity 203, and send the forwarding indication message to GW-U device 205. The forwarding indication message is used to instruct GW-U device 205 to process the packet received by GW-U device 205. GW-U device 205 is configured to receive the signaling sent by base station 202, and send the signaling to GW-C device 204 according to the forwarding indication message. GW-C device 204 is further configured to receive and process the signaling sent by GW-U device 205. GW-U device 205 is further configured to, in the data transmission procedure, receive the broadcast/multicast service data packet sent by broadcast/multicast service center 201 and send the broadcast/multicast service data packet to base station 202 according to the forwarding indication message.

In this way, GW-U device 205 and GW-C device 204 may be two separate devices, GW-C device 204 is responsible for processing session-related signaling, and GW-U device 205 is responsible for receiving and forwarding, in the data transmission procedure, the broadcast/multicast service data packet sent by broadcast/multicast service center 201. Therefore, after a new function is added into or a new service is deployed in GW-C device 204, GW-U device 205 does not need to be modified, allowing GW-C device 204 and GW-U device 205 to independently evolve.

Embodiment 2

This embodiment of the present disclosure provides an eMBMS system management method. An eMBMS system includes a broadcast/multicast service center, a base station, a mobility management entity connected to the base station, a GW-C device connected to the mobility management entity and the broadcast/multicast service center, and a GW-U device connected to the base station and the broadcast/multicast service center. The GW-C device connects to the GW-U device.

Figure 4:
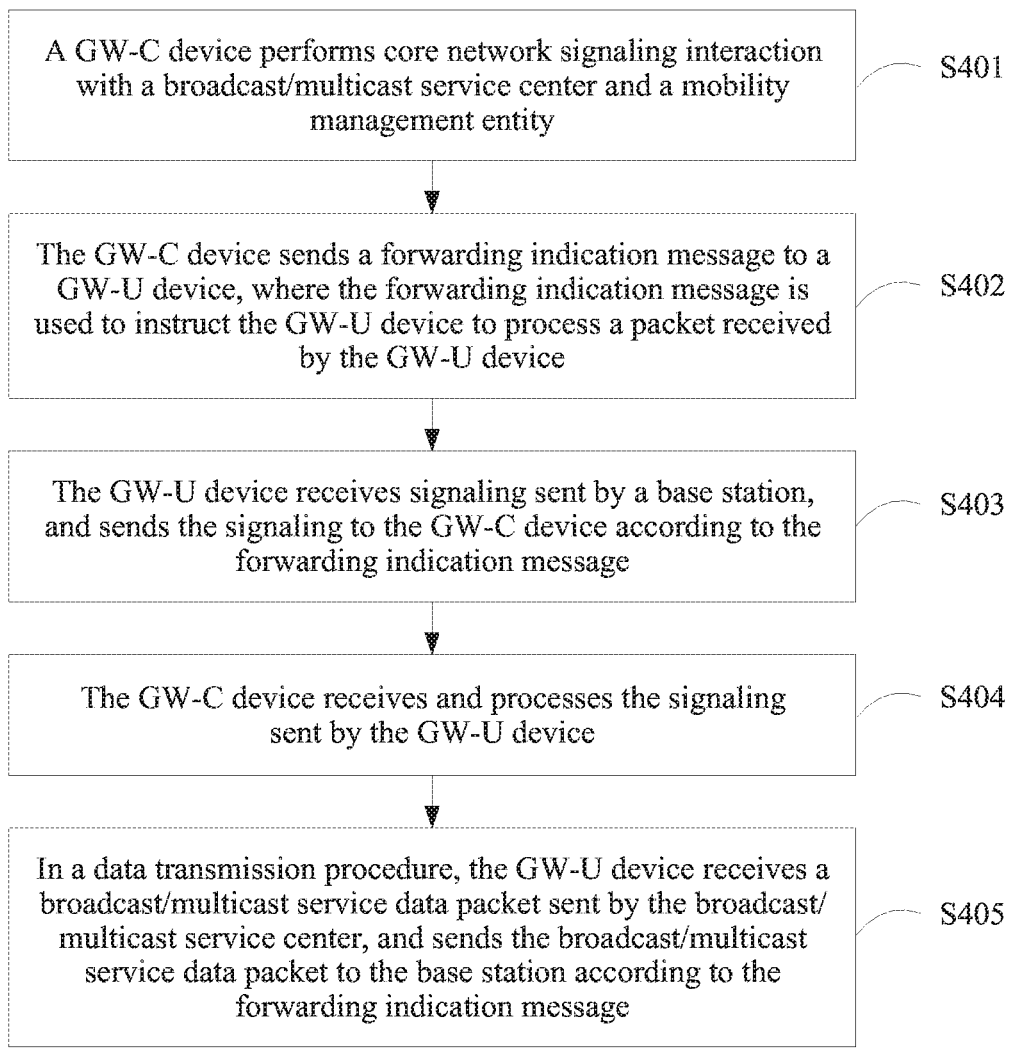
FIG. 4 is a schematic flowchart of an eMBMS system management method according to an embodiment of the present disclosure.

As shown in FIG. 4, the method includes the following steps:

S401. The GW-C device performs core network signaling interaction with the broadcast/multicast service center and the mobility management entity.

S402. The GW-C device sends a forwarding indication message to the GW-U device. The forwarding indication message is used to instruct the GW-U device to process a packet received by the GW-U device.

S403. The GW-U device receives signaling sent by the base station and sends the signaling to the GW-C device according to the forwarding indication message.

S404. The GW-C device receives and processes the signaling sent by the GW-U device.

S405. In a data transmission procedure, the GW-U device receives a broadcast/multicast service data packet sent by the broadcast/multicast service center and sends the broadcast/multicast service data packet to the base station according to the forwarding indication message.

In this way, the GW-U device and the GW-C device may be two separate devices, the GW-C device being responsible for processing all session-related signaling, and the GW-U device just being responsible for receiving and forwarding, in the data transmission procedure, the broadcast/multicast service data packet sent by the broadcast/multicast service center. Therefore, after a new function is added into or a new service is deployed in the GW-C device, the GW-U device does not need to be modified, allowing the GW-C device and the GW-U device to independently evolve.

The following describes the eMBMS system management method provided in this embodiment of the present disclosure in detail.

First, it should be noted that a service procedure of the eMBMS system may include a session establishment procedure, a data transmission procedure, and a session termination procedure.

In the session establishment procedure, step S401 includes receiving a first session start request message sent by the broadcast/multicast service center and sending, by the GW-C device, a second session start request message to the mobility management entity. The first session start request message is used to establish a bearer between the GW-U device and the broadcast/multicast service center, and the second session start request message is used to establish a bearer between the base station and the GW-U device.

Optionally, the GW-U device connects to the broadcast/multicast service center using an SGi-mb interface, and the method further includes allocating, when a sending manner on the SGi-mb interface is a unicast manner, by the GW-C device a destination UDP port corresponding to the SGi-mb interface.

Optionally, the GW-U device connects to the broadcast/multicast service center using an SGi-mb interface, and the method further includes, when a sending manner on the SGi-mb interface is a multicast manner, sending by the GW-C device a multicast group join instruction message to the GW-U device. The multicast group join instruction message includes a first multicast group join request message, and is used to instruct the GW-U device to send the first multicast group join request message to the broadcast/multicast service center. The method further includes sending by the GW-U device the first multicast group join request message to the broadcast/multicast service center and adding, by the broadcast/multicast service center according to the first multicast group join request message, the GW-U device into an IP multicast group using the broadcast/multicast service center as a source point.

Optionally, the GW-U device connects to the base station using an M1 interface, and the method further includes allocating by the GW-C device an IP multicast address of the M1 interface and a tunnel identifier. The IP multicast address is used to identify an IP multicast group using the GW-U device as a source point.

Optionally, in the session establishment procedure, the forwarding indication message includes a first forwarding rule, and the first forwarding rule is a rule used when the GW-U device processes the signaling sent by the base station to the GW-U device. In addition, in the session establishment procedure, the signaling sent by the base station to the GW-U device includes a second multicast group join request message, and step S402 includes receiving by the GW-U device the second multicast group join request message sent by the base station, preprocessing the second multicast group join request message according to the first forwarding rule, and sending a preprocessed second multicast group join request message to the GW-C device.

Step S403 includes adding, after receiving the preprocessed second multicast group join request message, by the GW-C device according to the preprocessed second multicast group join request message, the base station into the IP multicast group using the GW-U device as the source point.

Optionally, in the session establishment procedure, the forwarding indication message sent by the GW-C device to the GW-U device may further include a second forwarding rule, and the second forwarding rule is a rule used when the GW-U device processes the packet sent by the broadcast/multicast service center to the GW-U device. That is, the GW-U device sends the broadcast/multicast service data packet to the base station according to the second forwarding rule after receiving the broadcast/multicast service data packet.

Figure 5A:
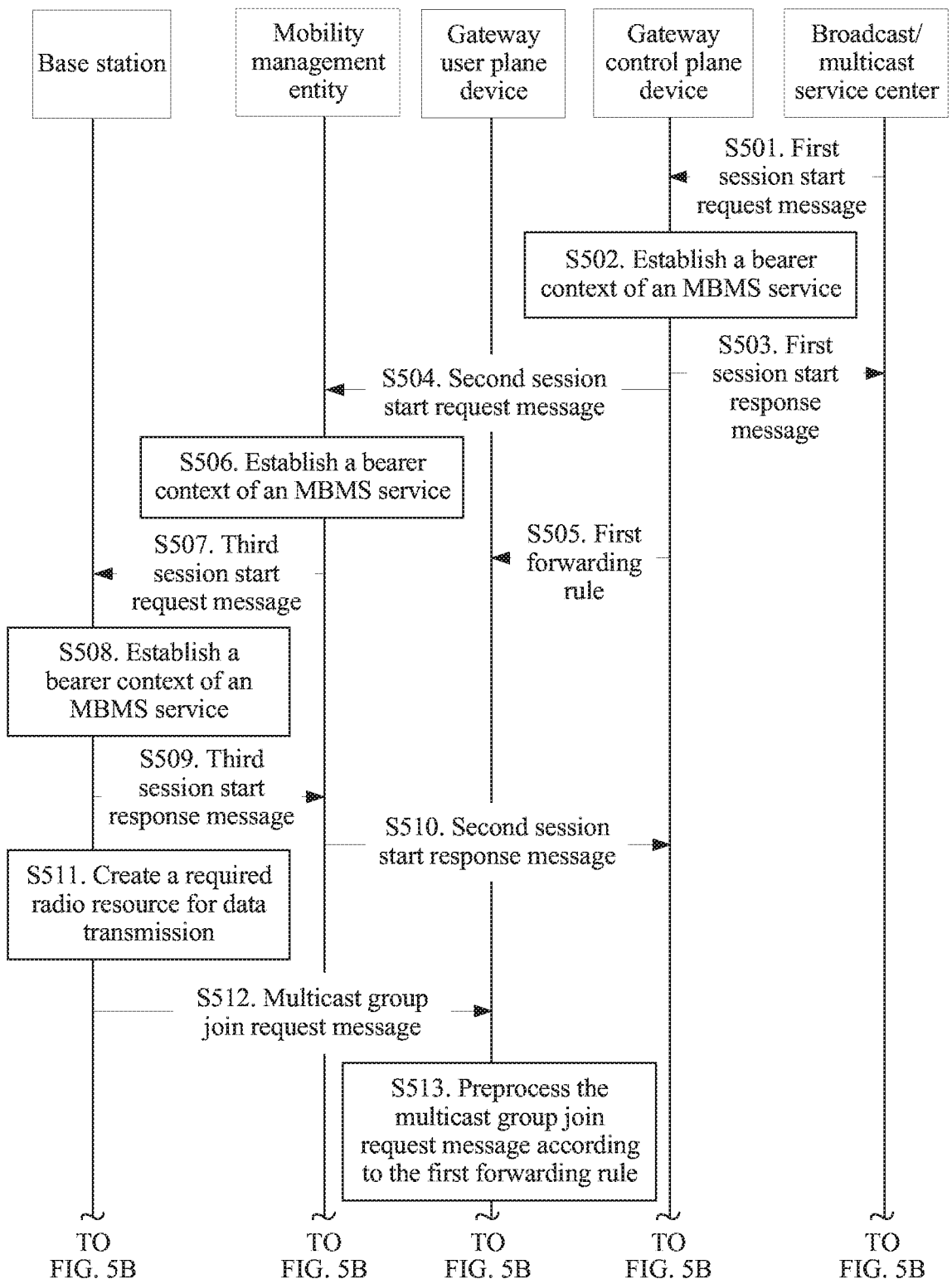
FIG. 5A and FIG. 5B are a schematic diagram of a session establishment procedure of an eMBMS system according to an embodiment of the present disclosure.
Figure 5B:
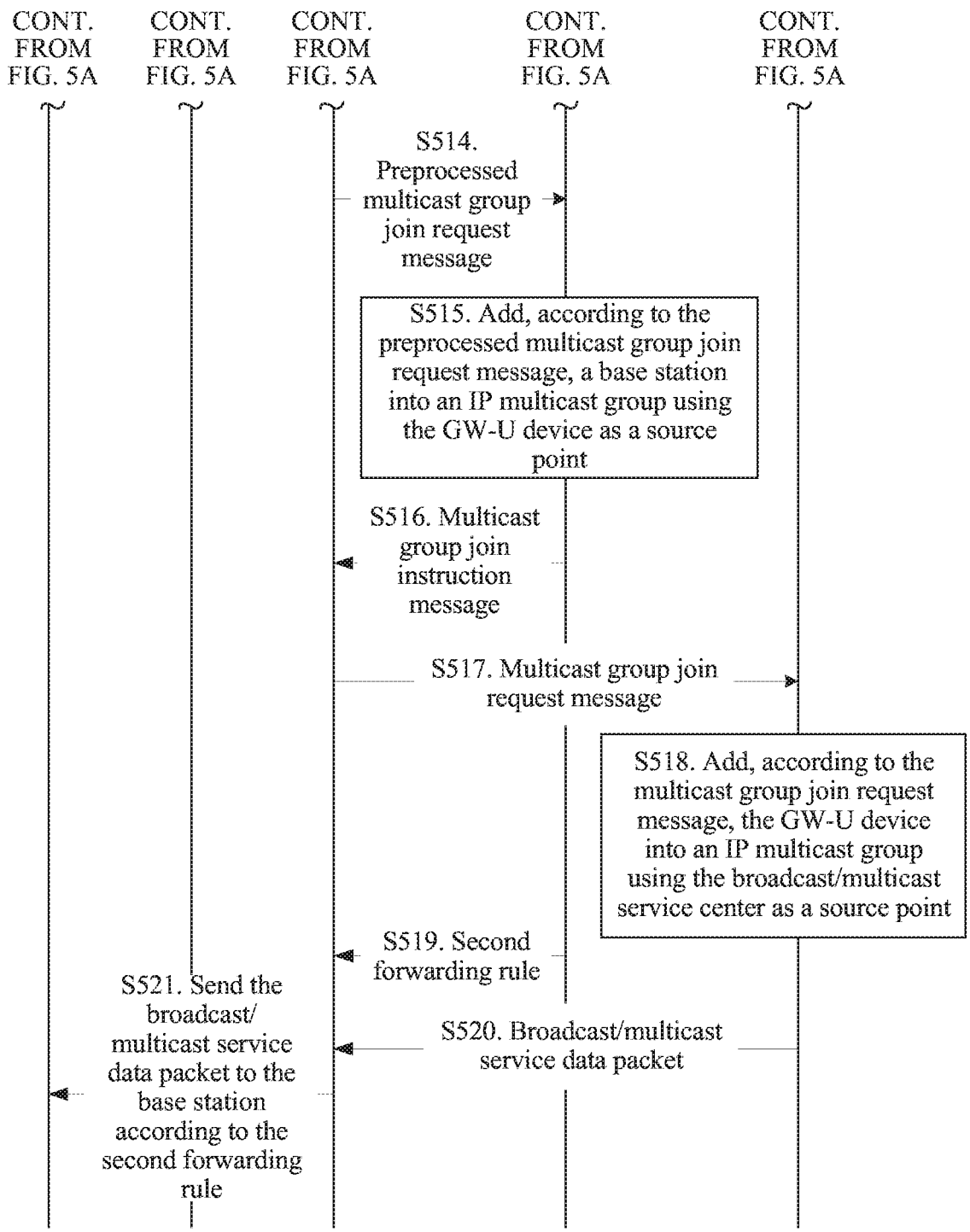

To assist a person skilled in the art in understanding the eMBMS system management method provided in this embodiment of the present disclosure, the following describes a method of session establishment to transmit data using a specific embodiment. As shown in FIG. 5A and FIG. 5B, the method procedure includes the following steps:

S501. A broadcast/multicast service center sends a first session start request message to a GW-C device.

For example, the broadcast/multicast service center may send the first session start request message to the GW-C device after establishing a bearer context of an MBMS service.

The first session start request message is used to establish a bearer between a GW-U device and the broadcast/multicast service center.

S502. After receiving the first session start request message, the GW-C device establishes a bearer context of an MBMS service.

Optionally, after receiving the first session start request message, the gateway control plane device may further determine a sending manner on an SGi-mb interface. It should be noted that the SGi-mb interface is an interface between the GW-U device and the broadcast/multicast service center. The broadcast/multicast service center may send a broadcast/multicast service data packet to the GW-U device in a unicast manner or may send a broadcast/multicast service data packet to the GW-U device in a multicast manner.

When determining that the sending manner on the SGi-mb interface is a unicast manner, the GW-C device may allocate a destination UDP port corresponding to the SGi-mb interface. In this way, the GW-U device may receive, using the UDP port, the broadcast/multicast service data packet sent by the broadcast/multicast service center to the GW-U device in a unicast manner.

This embodiment of the present disclosure is described using an example in which the broadcast/multicast service center uses a multicast manner.

Optionally, after receiving the first session start request message, the GW-C device may further allocate an IP multicast address of an M1 interface between the GW-U device and a base station and a tunnel identifier.

It should be noted that, after receiving the broadcast/multicast service data packet, the GW-U device may send the broadcast/multicast service data packet to all base stations in an IP multicast group using the GW-U device as a source point. The IP multicast group is marked in a manner of an IP multicast address+a multicast source address, that is, the IP multicast address allocated by GW-C device to the M1 interface is used to mark the IP multicast group.

In addition, it should be noted that an interaction packet between the GW-U device and the base station may be encapsulated using the GPRS Tunneling Protocol. The tunnel identifier is a field in the GTP and used to identify a tunnel endpoint.

S503. The GW-C device sends a first session start response message to the broadcast/multicast service center.

S504. The GW-C device sends a second session start request message to a mobility management entity.

S505. The GW-C device sends a first forwarding rule to a GW-U device.

The first forwarding rule may indicate a message that needs to be forwarded by the GW-U device and preprocessing that needs to be performed by the GW-U device on the message. For details, refer to the following step S513.

S506. After receiving the second session start request message, the mobility management entity establishes a bearer context of an MBMS service.

S507. The mobility management entity sends a third session start request message to a base station.

S508. After receiving the third session start request message, the base station establishes a bearer context of an MBMS service.

S509. The base station sends a third session start response message to the mobility management entity.

S510. The mobility management entity sends a second session start response message to the GW-C device.

S511. The base station creates a radio resource for MBMS data transmission.

S512. The base station sends a multicast group join request message to the GW-U device.

S513. The GW-U device preprocesses the multicast group join request message according to the first forwarding rule.

For example, the preprocessing may be encapsulating the multicast group join request message using the OpenFlow protocol to obtain a Packet-in message. The packet-in message includes a port through which the GW-U device receives the multicast group join request message, and the packet-in message is a preprocessed multicast group join request message.

S514. The GW-U device sends a preprocessed multicast group join request message to the GW-C device.

S515. The GW-C device adds, according to the preprocessed multicast group join request message, the base station into an IP multicast group using the GW-U device as a source point.

S516. The GW-C device sends a multicast group join instruction message to the GW-U device.

The multicast group join instruction message includes the multicast group join request message and is used to instruct the GW-U device to send the multicast group join request message to the broadcast/multicast service center.

It should be noted that this embodiment of the present disclosure is described using an example in which the broadcast/multicast service center sends the broadcast/multicast service data packet to the GW-U device in a multicast manner. In this case, the GW-U device joins an IP multicast group using the broadcast/multicast service center as a source point. Optionally, the broadcast/multicast service center may send the broadcast/multicast service data packet in a unicast manner.

S517. The GW-U device sends the multicast group join request message in the multicast group join instruction message to the broadcast/multicast service center.

S518. The broadcast/multicast service center adds, according to the multicast group join request message, the GW-U device into an IP multicast group using the broadcast/multicast service center as a source point.

S519. The GW-C device sends a second forwarding rule to the GW-U device.

S520. The broadcast/multicast service center sends a broadcast/multicast service data packet to the GW-U device in a multicast manner.

S521. The GW-U device sends the broadcast/multicast service data packet to the base station according to the second forwarding rule.

It should be noted that, for ease of description, the foregoing method is represented as a combination of a series of actions. However, a person skilled in the art would understand that the present disclosure is not limited by the described action sequence and that the actions mentioned are not necessarily required by the present disclosure.

It may be learned from step S501 to step S521 that, in a session establishment procedure and a data transmission procedure, session-related signaling is processed by the GW-C device, and the GW-U device is responsible for receiving and forwarding the broadcast/multicast service data packet in the data transmission procedure.

Further, in a session termination procedure, step S401 further includes, in the session termination procedure, receiving by the GW-C device a first session termination request message sent by the broadcast/multicast service center, the first session termination request message including specified time information, and releasing by the GW-C device a bearer context at a moment specified by the specified time information.

Optionally, in the session termination procedure, the forwarding indication message sent by the GW-C device to the GW-U device includes a rule deletion instruction. For example, the GW-C device may send the rule deletion instruction to the GW-U device at the moment specified by the specified time information. The GW-U device deletes, according to the rule deletion instruction, a second forwarding rule used when the GW-U device processes the broadcast/multicast service data packet.

Optionally, step S401 further includes sending by the GW-C device a second session termination request message to the mobility management entity, the second session termination request message including the specified time information, such that the mobility management entity sends the specified time information to the base station and the base station releases the bearer context according to the specified time information.

Optionally, in the session termination procedure, step S402 further includes receiving by the GW-U device a first multicast group removal request message sent by the base station, preprocessing the first multicast group removal request message according to a first forwarding rule, and sending a preprocessed first multicast group removal request message to the GW-C device.

Step S403 further includes removing, after receiving the preprocessed first multicast group removal request message, by the GW-C device according to the preprocessed first multicast group removal request message, the base station from the IP multicast group using the GW-U device as the source point.

Optionally, if the sending manner on the SGi-mb interface between the broadcast/multicast service center and the gateway user plane device is the multicast manner, in the session termination procedure, the method further includes sending by the GW-C device a multicast group removal instruction message to the GW-U device. The multicast group removal instruction message includes a second multicast group removal request message and is used to instruct the GW-U device to send the second multicast group removal request message to the broadcast/multicast service center. The method further includes sending by the GW-U device the second multicast group removal request message to the broadcast/multicast service center. The second multicast group removal request message is used to instruct the broadcast/multicast service center to remove the GW-U device from the IP multicast group using the broadcast/multicast service center as the source point.

Figure 6A:
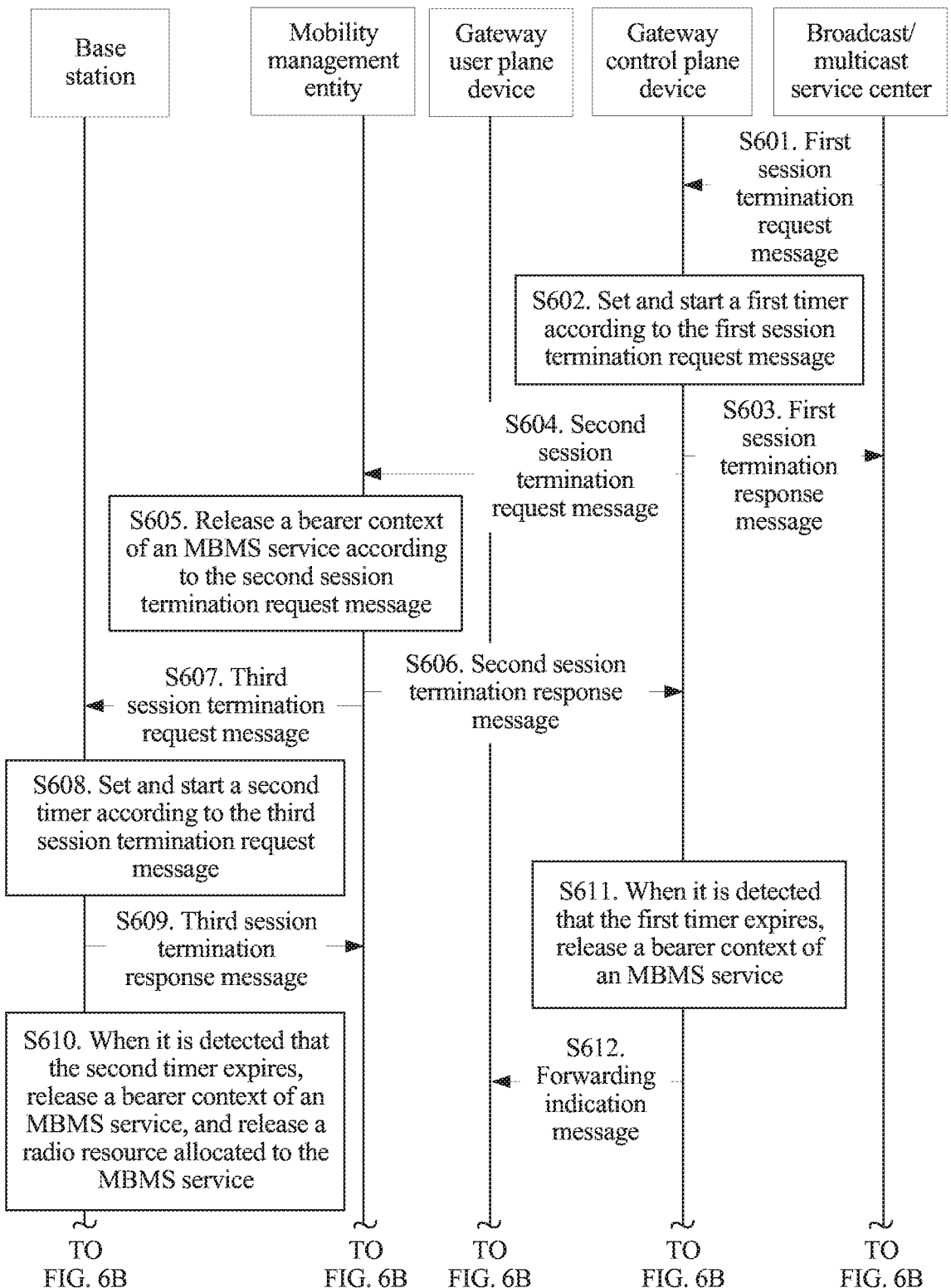
FIG. 6A and FIG. 6B are a schematic diagram of a session termination procedure of an eMBMS system according to an embodiment of the present disclosure.
Figure 6B:
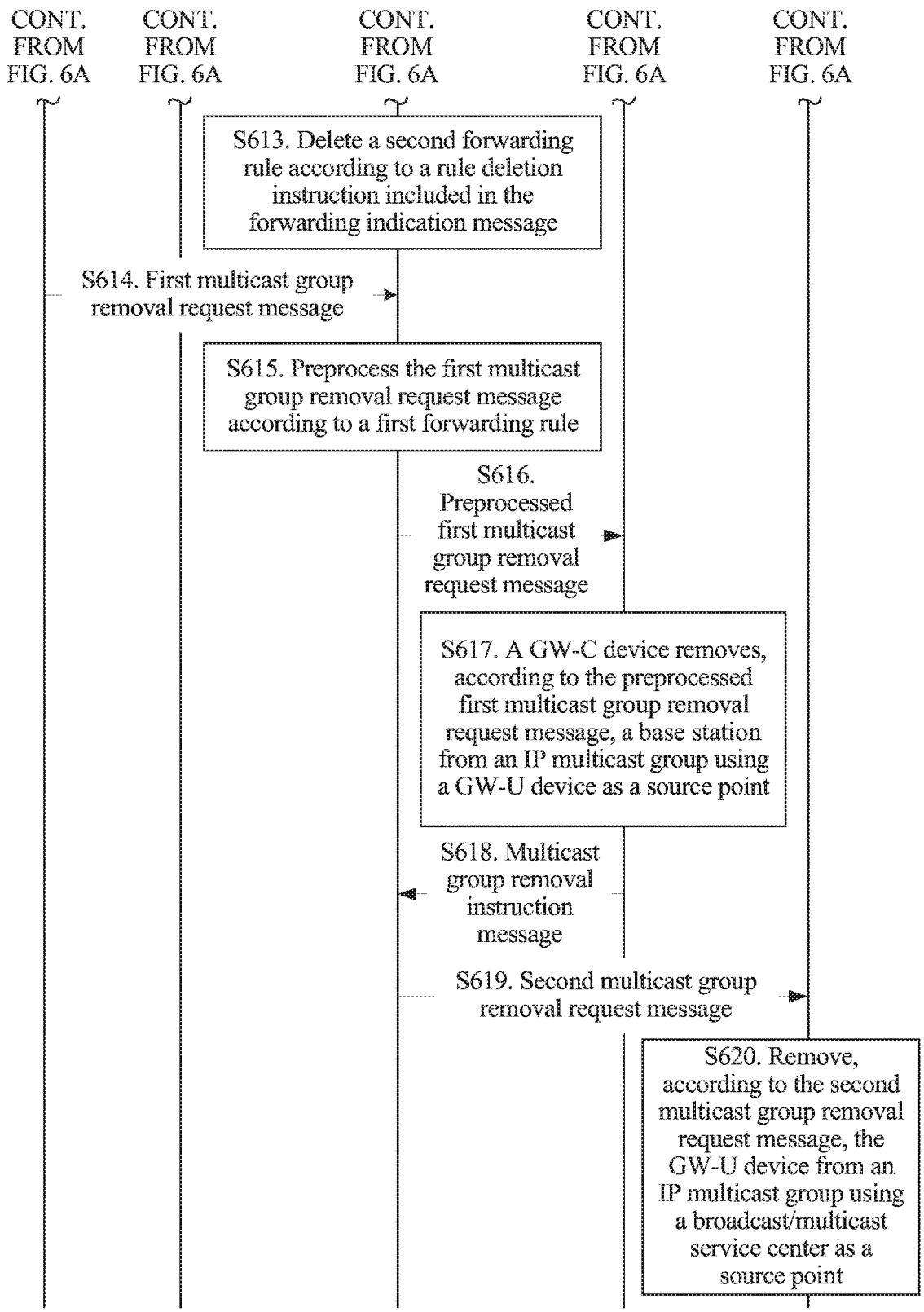

To assist a person skilled in the art in understanding the eMBMS system management method provided in the present disclosure, the following describes a session termination procedure using a specific embodiment. As shown in FIG. 6A and FIG. 6B, the session termination procedure includes the following steps:

S601. A broadcast/multicast service center sends a first session termination request message to a GW-C device.

The first session termination request message includes specified time information.

For example, before sending the first session termination request message, the broadcast/multicast service center may change a usage status of a bearer between a GW-U device and the broadcast/multicast service center into a standby state.

S602. The GW-C device sets and starts a first timer according to the first session termination request message.

For example, a time type of a moment specified by the specified time information may be an absolute time type or may be a relative time type. After receiving the first session termination request message, the GW-C device may set and start, according to the specified time information, a timer that expires at the specified moment.

S603. The GW-C device sends a first session termination response message to the broadcast/multicast service center.

S604. The GW-C device sends a second session termination request message to a mobility management entity.

The second session termination request message includes the specified time information.

S605. The mobility management entity releases a bearer context of an MBMS service according to the second session termination request message.

S606. The mobility management entity sends a second session termination response message to the GW-C device.

S607. The mobility management entity sends a third session termination request message to a base station.

The third session termination request message includes the specified time information.

S608. The base station sets and starts a second timer according to the third session termination request message.

For details, refer to the description corresponding to step S602. The base station may set and start, according to the specified time information, the second timer that expires at the specified moment.

S609. The base station sends a third session termination response message to the mobility management entity.

S610. When detecting that the second timer expires, the base station releases a bearer context of an MBMS service, and releases a radio resource allocated to the MBMS service.

S611. When detecting that the first timer expires, the GW-C device releases a bearer context of an MBMS service.

It should be noted that the first timer and the second timer may expire at a same moment, that is, step S610 and step S611 may be performed at the same time. The present disclosure, however, is not limited to this scenario.

S612. The GW-C device sends a forwarding indication message to a GW-U device.

The forwarding indication message may include a rule deletion instruction.

For example, after detecting that the first timer expires, the GW-C device sends the forwarding indication message to the GW-U device. The rule deletion instruction included in the forwarding indication message is used to instruct the GW-U device to delete a second forwarding rule. The second forwarding rule is sent by the GW-C device to the GW-U device in a service establishment procedure, such that the GW-U device processes a received broadcast/multicast service data packet according to the second forwarding rule.

S613. After receiving the forwarding indication message, the GW-U device deletes a second forwarding rule according to a rule deletion instruction included in the forwarding indication message.

S614. The base station sends a first multicast group removal request message to the GW-U device.

S615. The GW-U device preprocesses the first multicast group removal request message according to a first forwarding rule.

The first forwarding rule is sent by the GW-C device to the GW-U device in the service establishment procedure, such that the GW-U device processes received signaling according to the first forwarding rule.

For example, the preprocessing may be encapsulating the first multicast group removal request message using the OpenFlow protocol to obtain a Packet-in message. The packet-in message includes a port through which the GW-U device receives the first multicast group removal request message, and the packet-in message is a preprocessed first multicast group removal request message.

S616. The GW-U device sends a preprocessed first multicast group removal request message to the GW-C device.

S617. The GW-C device removes, according to the pre-processed first multicast group removal request message, the base station from an IP multicast group using the GW-U device as a source point.

S618. The GW-C device sends a multicast group removal instruction message to the GW-U device.

The multicast group removal instruction message includes a second multicast group removal request message and is used to instruct the GW-U device to send the second multicast group removal request message to the broadcast/multicast service center.

S619. The GW-U device sends a second multicast group removal request message to the broadcast/multicast service center.

For example, the multicast group removal instruction message sent by the GW-C device to the GW-U device is a Packet-out message encapsulated using the OpenFlow protocol. The packet-out message may include the second multicast group removal request message and a message forwarding indication. In this way, after receiving the multicast group removal instruction message, the GW-U device sends the second multicast group removal request message to the broadcast/multicast service center according to the message forwarding indication.

S620. The broadcast/multicast service center removes, according to the second multicast group removal request message, the GW-U device from an IP multicast group using the broadcast/multicast service center as a source point.

It should be noted that, for ease of description, the foregoing method is described as a combination of a series of actions. However, a person skilled in the art would understand that the present disclosure is not limited by the described action sequence and the actions mentioned are not necessarily required by the present disclosure.

It may be learned from step S601 to step S620 that session-related signaling is processed by the GW-C device in the session termination procedure.

According to the eMBMS system management method provided in this embodiment of the present disclosure, the eMBMS system includes the broadcast/multicast service center, the base station, the mobility management entity connected to the base station, the GW-C device connected to the mobility management entity and the broadcast/multicast service center, and the GW-U device connected to the base station and the broadcast/multicast service center. The GW-C device is configured to perform core network signaling interaction with the broadcast/multicast service center and the mobility management entity. The GW-U device is configured to receive the signaling sent by the base station and send the signaling to the GW-C device according to the first forwarding rule. The GW-C device is further configured to receive and process the signaling sent by the GW-U device. The GW-U device is further configured to, in the data transmission procedure, receive the broadcast/multicast service data packet sent by the broadcast/multicast service center and send the broadcast/multicast service data packet to the base station according to the second forwarding rule.

In this way, the GW-U device and the GW-C device may be two separate devices, the GW-C device being responsible for processing session-related signaling, and the GW-U device being responsible for receiving and forwarding, in the data transmission procedure, the broadcast/multicast service data packet sent by the broadcast/multicast service center. Therefore, after a new function is added into or a new service is deployed in the GW-C device, the GW-U device does not need to be modified, allowing the GW-C device and the GW-U device to independently evolve.

Embodiment 3

Figure 7:
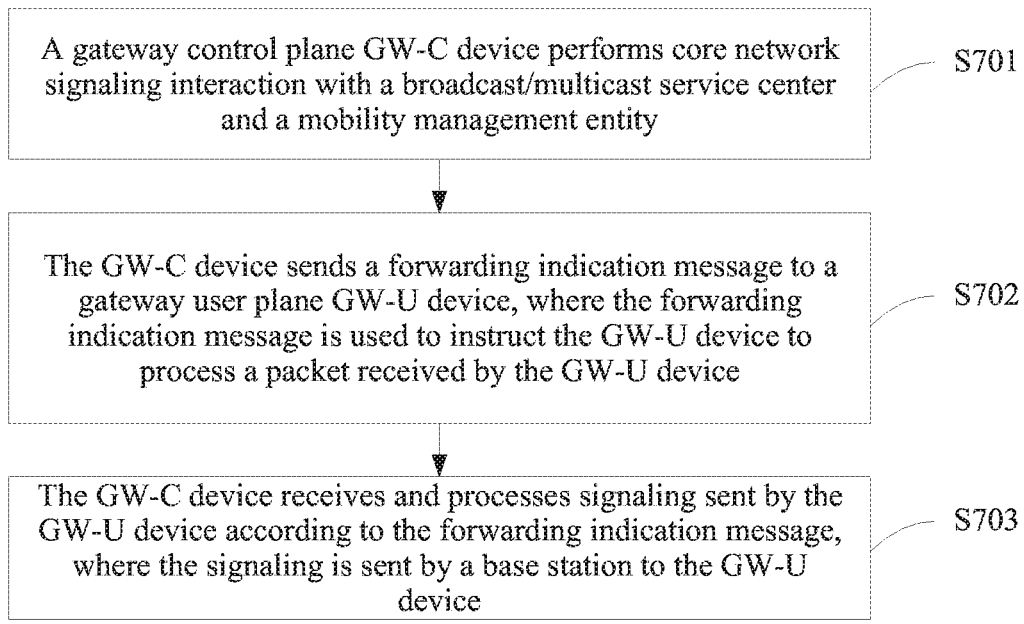
FIG. 7 is a schematic flowchart of another eMBMS system management method according to an embodiment of the present disclosure.

This embodiment of the present disclosure provides an eMBMS system management method, applied to a GW-C device. As shown in FIG. 7, the method includes the following steps:

S701. The GW-C device performs core network signaling interaction with a broadcast/multicast service center and a mobility management entity.

S702. The GW-C device sends a forwarding indication message to a GW-U device.

The forwarding indication message is used to instruct the GW-U device to process a packet received by the GW-U device.

S703. The GW-C device receives and processes signaling sent by the GW-U device according to the forwarding indication message. The signaling is sent by the base station to the GW-U device.

For details, refer to Embodiment 1. The mobility management entity, the broadcast/multicast service center, and the GW-U device in the eMBMS system separately connect to the GW-C device. The eMBMS system management method provided in this embodiment of the present disclosure mainly relates to a method for interacting with the mobility management entity, the broadcast/multicast service center, and the GW-U device by the GW-C device, so as to establish a session and terminate a session. The following describes step S701 to step S703 in detail.

Optionally, the GW-C device performing core network signaling interaction with a broadcast/multicast service center and a mobility management entity includes, in a session establishment procedure, receiving a first session start request message sent by the broadcast/multicast service center and sending a second session start request message to the mobility management entity. The first session start request message is used to establish a bearer between the GW-U device and the broadcast/multicast service center, and the second session start request message is used to establish a bearer between the base station and the GW-U device.

Further, the GW-U device connects to the broadcast/multicast service center using a SGi-mb interface, and the method further includes allocating, when a sending manner on the SGi-mb interface is a unicast manner, a destination UDP port corresponding to the SGi-mb interface.

For example, the first session start request message may further include identification information used to identify the sending manner on the SGi-mb interface. In this way, after receiving the first session start request message, the GW-C device may determine the sending manner on the SGi-mb interface according to the identification information. It should be noted that the broadcast/multicast service center may send the broadcast/multicast service data packet to the GW-U device in a unicast manner or a multicast manner. If the sending manner on the SGi-mb interface is the unicast manner, the GW-C device may allocate the destination UDP port corresponding to the SGi-mb interface, so that the GW-U device receives, using the UDP port, the broadcast/multicast service data packet sent by the broadcast/multicast service center.

Optionally, the GW-U device connects to the broadcast/multicast service center using an SGi-mb interface, and the method further includes, when a sending manner on the SGi-mb interface is a multicast manner, sending a multicast group join instruction message to the GW-U device. The multicast group join instruction message includes a first multicast group join request message and is used to instruct the GW-U device to send the first multicast group join request message to the broadcast/multicast service center.

For example, the OpenFlow protocol may be used as an interface protocol between the GW-U device and the GW-C device. The GW-C device encapsulates the first multicast group join request message using the OpenFlow protocol to obtain a Packet-out message, that is, the multicast group join instruction message. In this way, after receiving the multicast group join instruction message, the GW-U device obtains the first multicast group join request message by means of parsing, and sends the first multicast group join request message to the broadcast/multicast service center according to an instruction. The broadcast/multicast service center adds, according to the first multicast group join request message, the GW-U device into an IP multicast group using the broadcast/multicast service center as a source point, so that the broadcast/multicast service center can send the broadcast/multicast service data packet to the GW-U device in a multicast manner.

Optionally, the GW-U device connects to the base station using an M1 interface, and the method further includes allocating an IP multicast address of the M1 interface and a tunnel identifier, the IP multicast address being used to identify an IP multicast group using the GW-U device as a source point.

It should be noted that, after receiving the broadcast/multicast service data packet, the GW-U device may send the broadcast/multicast service data packet to all base stations in the IP multicast group using the GW-U device as the source point. The IP multicast group is marked in a manner of an IP multicast address+a multicast source address, that is, the IP multicast address allocated by GW-C device to the M1 interface is used to mark the IP multicast group.

In addition, it should be noted that an interaction packet between the GW-U device and the base station may be encapsulated using the GPRS Tunneling Protocol GTP. The tunnel identifier is a field in the GTP and used to identify a tunnel endpoint.

Optionally, in a specific implementation process, the forwarding indication message sent by the GW-C device to the GW-U device in the session establishment procedure may include a first forwarding rule, and the first forwarding rule is a rule used when the GW-U device processes the signaling sent by the base station to the GW-U device. In this way, step S703 includes receiving, by the GW-C device, a preprocessed second multicast group join request message sent by the GW-U device, the preprocessed second multicast group join request message being obtained after the GW-U device preprocesses, according to the first forwarding rule, a second multicast group join request message sent by the base station. Step S703 further includes adding, according to the preprocessed second multicast group join request message, the base station into the IP multicast group using the GW-U device as the source point.

It may be learned from the foregoing description that, in the eMBMS system provided in this embodiment of the present disclosure, in the session establishment procedure, related signaling is processed by the GW-U device, and the GW-C device just forwards the related signaling and the broadcast/multicast service data packet according to an instruction of the GW-C.

Further, in a session termination procedure, the gateway control plane GW-C device performing core network signaling interaction with a broadcast/multicast service center includes, in the session termination procedure, receiving by the GW-C device a first session termination request message sent by the broadcast/multicast service center, the first session termination request message including specified time information, and releasing a bearer context at a moment specified by the specified time information.

Further, in the session termination procedure, the GW-C device sending a forwarding indication message to a GW-U device includes sending the forwarding indication message to the GW-U device at the moment specified by the specified time information. The forwarding indication message includes a rule deletion instruction, such that the GW-U device deletes, according to the rule deletion instruction, a second forwarding rule used when the GW-U device processes a broadcast/multicast service data packet.

Optionally, in the session termination procedure, the gateway control plane GW-C device performing core network signaling interaction with a mobility management entity includes sending by the GW-C device a second session termination request message to the mobility management entity. The second session termination request message includes the specified time information, such that the mobility management entity sends the specified time information to the base station and the base station can release the bearer context according to the specified time information.

For example, the first session termination request message may include a service termination moment. After receiving the first session termination message, the GW-C device sends a second session termination message that includes a session termination moment to the mobility management entity. After receiving the second session termination message, the mobility management entity sends a third session termination message that includes the session termination moment to the base station. In this way, when the session termination moment arrives, the GW-C device, the mobility management entity, and the base station may release the bearer context at the same time.

Optionally, in the session termination procedure, the GW-C device receiving and processing signaling sent by the GW-U device according to the forwarding indication message includes receiving, by the GW-C device, a preprocessed first multicast group removal request message. The preprocessed first multicast group removal request message is obtained after the GW-U device preprocesses, according to a first forwarding rule, a first multicast group removal request message sent by the base station. The GW-C device receiving and processing signaling sent by the GW-C device according to the forwarding indication message further includes removing, according to the preprocessed first multicast group removal request message, the base station from the IP multicast group using the GW-U device as the source point.

Optionally, if the sending manner on the SGi-mb interface between the broadcast/multicast service center and the gateway user plane device is the multicast manner, the GW-C device may further send a multicast group removal instruction message to the GW-U device. The multicast group removal instruction message includes a second multicast group removal request message and is used to instruct the GW-U device to send the second multicast group removal request message to the broadcast/multicast service center. The second multicast group removal request message is used to instruct the broadcast/multicast service center to remove the GW-U device from an IP multicast group using the broadcast/multicast service center as a source point.

For example, the multicast group removal instruction message sent by the GW-C device to the GW-U device may be a Packet-out message encapsulated using the OpenFlow protocol. The packet-out message may include the second multicast group removal request message and a message forwarding indication. In this way, after receiving the multicast group removal instruction message, the GW-U device sends the second multicast group removal request message to the broadcast/multicast service center according to the message forwarding indication.

It may be learned from the foregoing description that, at the specified moment, the eMBMS system releases a bearer context of a related device, deletes the second forwarding rule used when the GW-U device processes the broadcast/multicast service data packet, and removes the base station and the GW-U device from corresponding IP multicast groups, so as to terminate a broadcast/multicast service. In addition, in this process, related signaling is processed by the GW-U device, and the GW-C device just forwards the related signaling according to an instruction of the GW-C.

In this way, in the session establishment procedure and the session termination procedure, the GW-C device is responsible for processing session-related signaling and instructing the GW-U device to forward received signaling. Behavior of the GW-U device is controlled by the GW-C device. Therefore, after a new function is added into or a new service is deployed in the GW-C device, the GW-U device does not need to be modified, allowing the GW-C device and the GW-U device to independently evolve.

Embodiment 4

Figure 8:
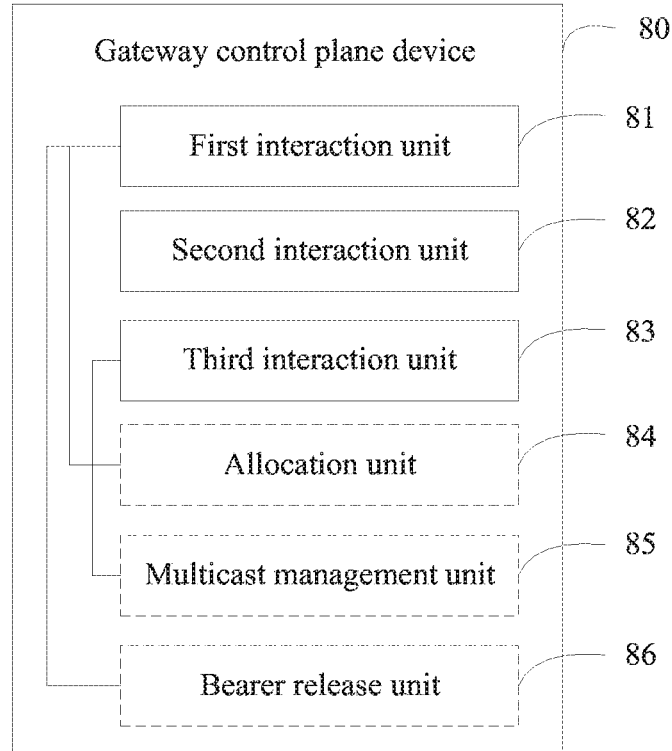
FIG. 8 is a schematic structural diagram of a gateway control plane device according to an embodiment of the present disclosure.

This embodiment of the present disclosure provides a GW-C device 80, so as to implement the eMBMS system management method provided in Embodiment 3. As shown in FIG. 8, GW-C device 80 includes a first interaction unit 81, a second interaction unit 82, and a third interaction unit 83. First interaction unit 81 is configured to perform core network signaling interaction with a broadcast/multicast service center. Second interaction unit 82 is configured to perform core network signaling interaction with a mobility management entity. Third interaction unit 83 is configured to send a forwarding indication message to a gateway user plane GW-U device. The forwarding indication message is used to instruct the GW-U device to process a packet received by the GW-U device. Third interaction unit 83 is further configured to receive and process signaling sent by the GW-U device according to the forwarding indication message, the signaling being sent by the base station to the GW-U device.

Optionally, first interaction unit 81 is configured to receive, in a session establishment procedure, a first session start request message sent by the broadcast/multicast service center. The first session start request message is used to establish a bearer between the GW-U device and the broadcast/multicast service center.

Second interaction unit 82 is configured to send a second session start request message to the mobility management entity. The second session start request message is used to establish a bearer between the base station and the GW-U device.

Optionally, the GW-U device connects to the broadcast/multicast service center using a SGi-mb interface, and GW-C device 80 further includes an allocation unit 84, configured to allocate, when a sending manner on the SGi-mb interface is a unicast manner, a destination UDP port corresponding to the SGi-mb interface.

Optionally, the GW-U device connects to the broadcast/multicast service center using a SGi-mb interface, and third interaction unit 83 is further configured to send, when a sending manner on the SGi-mb interface is a multicast manner, a multicast group join instruction message to the GW-U device. The multicast group join instruction message includes a first multicast group join request message and is used to instruct the GW-U device to send the first multicast group join request message to the broadcast/multicast service center.

Optionally, the GW-U device connects to the base station using an M1 interface, and allocation unit 84 is configured to allocate an IP multicast address of the M1 interface and a tunnel identifier. The IP multicast address is used to identify an IP multicast group using the GW-U device as a source point.

Optionally, the forwarding indication message includes a first forwarding rule, the first forwarding rule is a rule used when the GW-U device processes the signaling sent by the base station to the GW-U device, and third interaction unit 83 is configured to receive a preprocessed second multicast group join request message sent by the GW-U device. The preprocessed second multicast group join request message is obtained after the GW-U device preprocesses, according to the first forwarding rule, a second multicast group join request message sent by the base station.

GW-C device 80 further includes a multicast management unit 85 that is configured to add, according to the preprocessed second multicast group join request message, the base station into the IP multicast group using the GW-U device as the source point.

Optionally, first interaction unit 8i is further configured to receive, in a session termination procedure, a first session termination request message sent by the broadcast/multicast service center. The first session termination request message includes specified time information.

GW-C device 80 further includes a bearer release unit 86 that is configured to release a bearer context at a moment specified by the specified time information.

Optionally, third interaction unit 83 is configured to send the forwarding indication message to the GW-U device at the moment specified by the specified time information. The forwarding indication message includes a rule deletion instruction, so that the GW-U device deletes, according to the rule deletion instruction, a second forwarding rule used when the GW-U device processes a broadcast/multicast service data packet.

Optionally, second interaction unit 82 is further configured to send a second session termination request message to the mobility management entity. The second session termination request message includes the specified time information, so that the mobility management entity sends the specified time information to the base station, and the base station releases the bearer context according to the specified time information.

Optionally, third interaction unit 83 is further configured to receive a preprocessed first multicast group removal request message. The preprocessed first multicast group removal request message is obtained after the GW-U device preprocesses, according to a first forwarding rule, a first multicast group removal request message sent by the base station.

Multicast management unit 85 is further configured to remove, according to the preprocessed first multicast group removal request message, the base station from the IP multicast group using the GW-U device as the source point.

Optionally, if the sending manner on the SGi-mb interface between the broadcast/multicast service center and the gateway user plane device is the multicast manner, third interaction unit 83 is further configured to send a multicast group removal instruction message to the GW-U device. The multicast group removal instruction message includes a second multicast group removal request message and is used to instruct the GW-U device to send the second multicast group removal request message to the broadcast/multicast service center. The second multicast group removal request message is used to instruct the broadcast/multicast service center to remove the GW-U device from an IP multicast group using the broadcast/multicast service center as a source point.

A person skilled in the art would understand that, for purposes of convenience and conciseness, for a specific working process and description of the GW-C device, refer to a corresponding process in Embodiment 3.

According to the GW-C device, in the session establishment procedure and the session termination procedure, the GW-C device is responsible for processing session-related signaling and instructing the GW-U device to forward received signaling. Behavior of the GW-U device is controlled by the GW-C device. Therefore, after a new function is added into or a new service is deployed in the GW-C device, the GW-U device does not need to be modified, allowing the GW-C device and the GW-U device to independently evolve.

Embodiment 5

Figure 9:
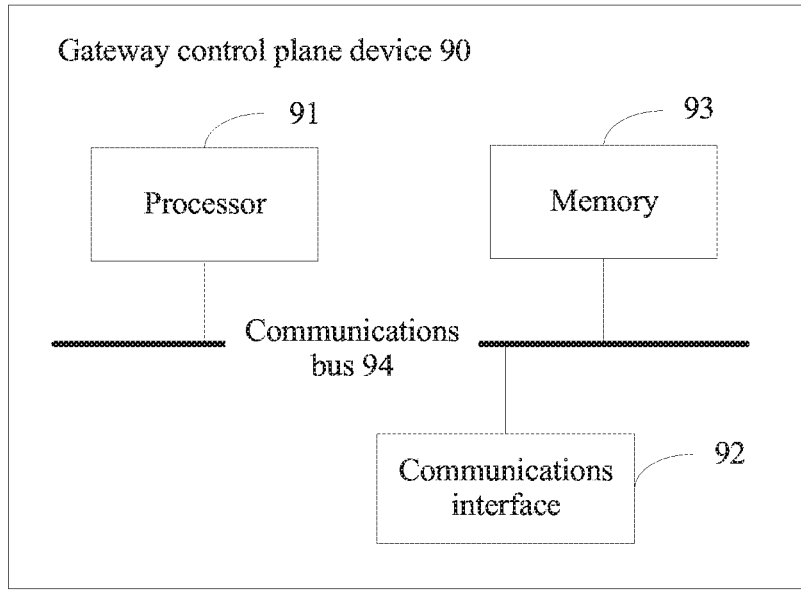
FIG. 9 is a schematic structural diagram of another gateway control plane device according to an embodiment of the present disclosure.

This embodiment of the present disclosure provides another GW-C device 90. As shown in FIG. 9, GW-C device 90 includes a processor 91, a communications interface 92, a memory 93, and a communications bus 94. Processor 91, communications interface 92, and memory 93 communicate with each other using communications bus 94.

Processor 91 may be a multi-core central processing unit (CPU) or an application-specific integrated circuit (ASIC), or is configured as one or more integrated circuits implementing this embodiment of the present disclosure.

Memory 93 is configured to store program code, and the program code includes a computer operation instruction and a network flow diagram. Memory 93 may include a high-speed random access memory (RAM), or may include a non-volatile memory such as at least one magnetic disk memory. Memory 93 may be a memory array. Memory 93 may be divided into blocks, and the blocks may be combined into a virtual volume according to a specific rule.

Communications interface 92 is configured to implement a connection and communication among these components.

Processor 91 is configured to execute the program code in memory 93, to implement operations that include performing core network signaling interaction with a broadcast/multicast service center and a mobility management entity; sending a forwarding indication message to a gateway user plane GW-U device, the forwarding indication message being used to instruct the GW-U device to process a packet received by the GW-U device; and receiving and processing signaling sent by the GW-U device according to the forwarding indication message, the signaling being sent by the base station to the GW-U device.

Optionally, performing core network signaling interaction with a broadcast/multicast service center and a mobility management entity includes, in a session establishment procedure, receiving a first session start request message sent by the broadcast/multicast service center, the first session start request message being used to establish a bearer between the GW-U device and the broadcast/multicast service center. Performing core network signaling interaction with a broadcast/multicast service center and a mobility management entity further includes sending a second session start request message to the mobility management entity, the second session start request message being used to establish a bearer between the base station and the GW-U device.

Optionally, the GW-U device connects to the broadcast/multicast service center using an SGi-mb interface, and the operations further include allocating, when a sending manner on the SGi-mb interface is a unicast manner, a destination UDP port corresponding to the SGi-mb interface.

Optionally, the GW-U device connects to the broadcast/multicast service center using an SGi-mb interface, and the operations further include sending, when a sending manner on the SGi-mb interface is a multicast manner, a multicast group join instruction message to the GW-U device. The multicast group join instruction message includes a first multicast group join request message and is used to instruct the GW-U device to send the first multicast group join request message to the broadcast/multicast service center.

Optionally, the GW-U device connects to the base station using an M1 interface, and the operations further include allocating an IP multicast address of the M1 interface and a tunnel identifier, the IP multicast address being used to identify an IP multicast group using the GW-U device as a source point.

Optionally, the forwarding indication message includes a first forwarding rule. The first forwarding rule is a rule used when the GW-U device processes the signaling sent by the base station to the GW-U device. Receiving and processing signaling sent by the GW-U device according to the forwarding indication message includes receiving a preprocessed second multicast group join request message sent by the GW-U device. The preprocessed second multicast group join request message is obtained after the GW-U device preprocesses, according to the first forwarding rule, a second multicast group join request message sent by the base station. Receiving and processing signaling sent by the GW-U device according to the forwarding indication message further includes adding, according to the preprocessed second multicast group join request message, the base station into the IP multicast group using the GW-U device as the source point.

Optionally, performing core network signaling interaction with a broadcast/multicast service center includes, in a session termination procedure, receiving a first session termination request message sent by the broadcast/multicast service center, the first session termination request message including specified time information; and releasing a bearer context at a moment specified by the specified time information.

Optionally, sending a forwarding indication message to a GW-U device includes sending the forwarding indication message to the GW-U device at the moment specified by the specified time information. The forwarding indication message includes a rule deletion instruction, so that the GW-U device deletes, according to the rule deletion instruction, a second forwarding rule used when the GW-U device processes a broadcast/multicast service data packet.

Optionally, performing core network signaling interaction with a mobility management entity includes sending a second session termination request message to the mobility management entity. The second session termination request message includes the specified time information, so that the mobility management entity sends the specified time information to the base station, and the base station releases the bearer context according to the specified time information.

Optionally, receiving and processing signaling sent by the GW-U device according to the forwarding indication message includes receiving a preprocessed first multicast group removal request message. The preprocessed first multicast group removal request message is obtained after the GW-U device preprocesses, according to a first forwarding rule, a first multicast group removal request message sent by the base station. Receiving and processing signaling sent by the GW-U device according to the forwarding indication message further includes removing, according to the preprocessed first multicast group removal request message, the base station from the IP multicast group using the GW-U device as the source point.

Optionally, if the sending manner on the SGi-mb interface between the broadcast/multicast service center and the GW-U device is the multicast manner, the operations further include sending a multicast group removal instruction message to the GW-U device. The multicast group removal instruction message includes a second multicast group removal request message and is used to instruct the GW-U device to send the second multicast group removal request message to the broadcast/multicast service center. The second multicast group removal request message is used to instruct the broadcast/multicast service center to remove the GW-U device from an IP multicast group using the broadcast/multicast service center as a source point.

Embodiment 6

Figure 10:
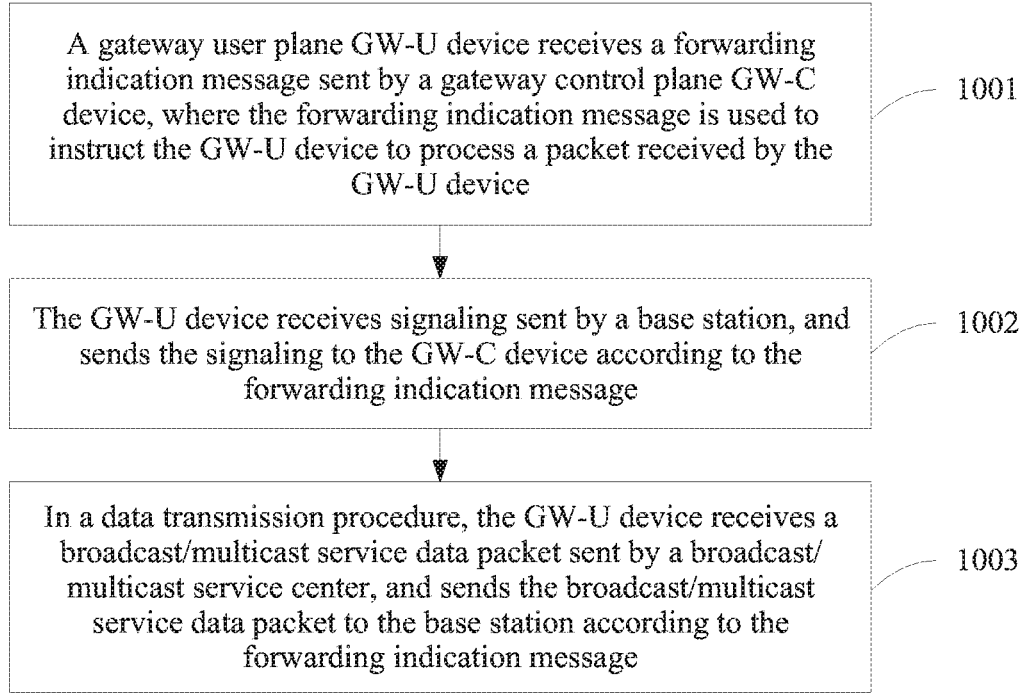
FIG. 10 is a schematic flowchart of still another eMBMS system management method according to an embodiment of the present disclosure.

This embodiment of the present disclosure provides an eMBMS system management method, applied to a GW-U device. As shown in FIG. 10, the method includes the following steps:

S1001. The GW-U device receives a forwarding indication message sent by a GW-C device, where the forwarding indication message is used to instruct the GW-U device to process a packet received by the GW-U device.

S1002. The GW-U device receives signaling sent by a base station and sends the signaling to the GW-C device according to the forwarding indication message.

S1003. In a data transmission procedure, the GW-U device receives a broadcast/multicast service data packet sent by a broadcast/multicast service center and sends the broadcast/multicast service data packet to the base station according to the forwarding indication message.

For details, refer to Embodiment 1. The base station, the broadcast/multicast service center, and the gateway control plane device in the eMBMS system separately connect to the GW-U device. The eMBMS system management method provided in this embodiment of the present disclosure mainly relates to a method for interacting with the base station, the broadcast/multicast service center, and the GW-C device by the GW-U device, so as to establish a session, transmit data, and terminate a session. The following describes step S1001 to step S1003 in detail.

Optionally, the GW-U device connects to the broadcast/multicast service center using an SGi-mb interface, and in a session establishment procedure, the method further includes, when a sending manner on the SGi-mb interface is a multicast manner, receiving by the GW-U device a multicast group join instruction message sent by the GW-C device to the GW-U device, the multicast group join instruction message including a first multicast group join request message; and sending the first multicast group join request message to the broadcast/multicast service center, so that the broadcast/multicast service center adds, according to the first multicast group join request message, the GW-U device into an IP multicast group using the broadcast/multicast service center as a source point.

For example, the OpenFlow protocol is used as an interface protocol between the GW-U device and the GW-C device. The GW-C device encapsulates the first multicast group join request message using the OpenFlow protocol to obtain a Packet-out message, that is, the multicast group join instruction message. In this way, after receiving the multicast group join instruction message, the GW-U device obtains the first multicast group join request message by means of parsing, and sends the first multicast group join request message to the broadcast/multicast service center according to an instruction.

Optionally, in the session establishment procedure, the forwarding indication message includes a first forwarding rule, the first forwarding rule is a rule used when the GW-U device processes the signaling sent by the base station to the GW-U device, and step S1002 includes receiving by the GW-U device a second multicast group join request message sent by the base station, preprocessing the second multicast group join request message according to the first forwarding rule, and sending a preprocessed second multicast group join request message to the GW-C device, so that the GW-C device adds, according to the preprocessed second multicast group join request message, the base station into an IP multicast group using the GW-U device as a source point.

For example, a message that is indicated by the first forwarding rule and is to be forwarded by the GW-U device includes the second multicast group join request message that is sent by the base station and used to request to join the IP multicast group, and indicates that preprocessing to be performed by the GW-U device on the second multicast group join request message is encapsulating the second multicast group join request message using the OpenFlow protocol to obtain a Packet-in message. The packet-in message includes a port through which the GW-U device receives the first multicast group join request message, and the packet-in message is the preprocessed second multicast request message.

Optionally, in the session establishment procedure, the forwarding indication message includes a second forwarding rule. The second forwarding rule is a rule used when the GW-U device processes the packet sent by the broadcast/multicast service center to the GW-U device. In this way, the GW-U device may send the broadcast/multicast service data packet to the base station according to the second forwarding rule.

For example, the second forwarding rule includes a manner that is indicated by the GW-C device and in which the GW-U device processes the broadcast/multicast service data packet, and at least one port through which the broadcast/multicast service data packet is output. The at least one port corresponds to at least one base station in the IP multicast group using the GW-U device as the source point. In this way, after receiving the broadcast/multicast service data packet, the GW-U device processes the broadcast/multicast service data packet according to the processing manner of the second forwarding rule, and forwards a processed broadcast/multicast service data packet to the corresponding at least one base station using the at least one port.

It may be learned from the foregoing description that, in certain embodiments of the eMBMS system, in the session establishment procedure, related signaling is processed by the GW-U device, and the GW-C device just forwards the related signaling and the broadcast/multicast service data packet according to an instruction of the GW-C.

Further, in a session termination procedure, the forwarding indication message may include a rule deletion instruction. In this case, the method may further include deleting, by the GW-U device according to the rule deletion instruction, a second forwarding rule used when the GW-U device processes the broadcast/multicast service data packet.

Further, in the session termination procedure, step S1002 includes receiving by the GW-U device a first multicast group removal request message sent by the base station, preprocessing the first multicast group removal request message according to a first forwarding rule, and sending a preprocessed first multicast group removal request message to the GW-C device, such that the GW-C device removes, according to the preprocessed first multicast group removal request message, the base station from an IP multicast group using the GW-U device as a source point.

Optionally, if the sending manner on the SGi-mb interface between the broadcast/multicast service center and the GW-U device is the multicast manner, the GW-U device may further receive a multicast group removal instruction message sent by the GW-C device to the GW-U device. The multicast group removal instruction message includes a second multicast group removal request message. The GW-U may send the second multicast group removal request message to the broadcast/multicast service center, the second multicast group removal request message being used to instruct the broadcast/multicast service center to remove the GW-U device from the IP multicast group using the broadcast/multicast service center as the source point.

For example, the multicast group removal instruction message sent by the GW-C device to the GW-U device may be a Packet-out message encapsulated using the OpenFlow protocol. The packet-out message may include the second multicast group removal request message and a message forwarding indication. In this way, after receiving the multicast group removal instruction message, the GW-U device sends the second multicast group removal request message to the broadcast/multicast service center according to the message forwarding indication.

It may be learned from the foregoing description that, in the session termination procedure, related signaling is processed by the GW-U device, and the GW-C device just forwards the related signaling according to an instruction of the GW-C.

In this way, behavior of the GW-U device may becontrolled by the GW-C device, and the GW-U device just forwards signaling and a data packet according to an instruction of the GW-C device. Therefore, after a new function is added into or a new service is deployed in the GW-C device, the GW-U device does not need to be modified, allowing the GW-C device and the GW-U device to independently evolve.

Embodiment 7

Figure 11:
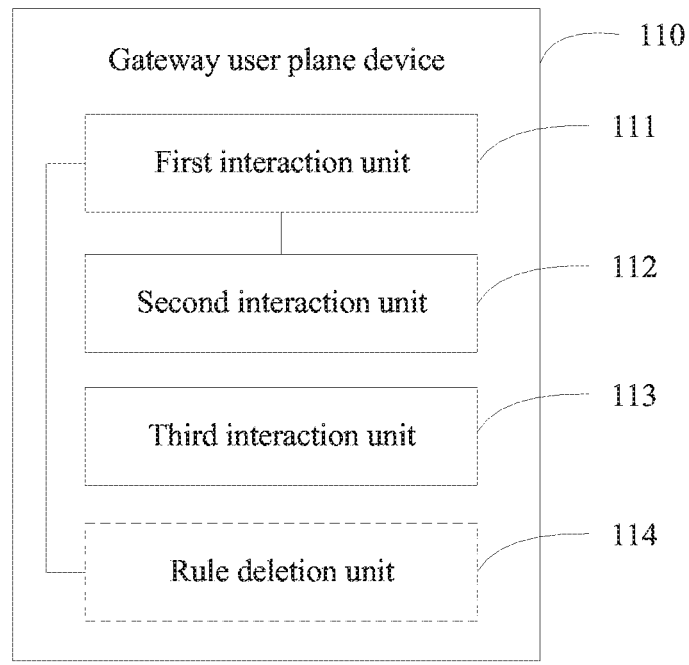
FIG. 11 is a schematic structural diagram of a gateway user plane device according to an embodiment of the present disclosure.

This embodiment of the present disclosure provides a GW-U device 110, so as to implement the eMBMS system management method provided in Embodiment 6. As shown in FIG. 11, GW-U device 110 includes a first interaction unit 111, a second interaction unit 112, and a third interaction unit 113.

First interaction unit 111 is configured to receive a forwarding indication message sent by a GW-C device. The forwarding indication message is used to instruct GW-U device 110 to process a packet received by GW-U device 110.

Second interaction unit 112 is configured to receive signaling sent by a base station.

First interaction unit 111 is further configured to send the signaling to the GW-C device according to the forwarding indication message.

Third interaction unit 113 is configured to receive, in a data transmission procedure, a broadcast/multicast service data packet sent by a broadcast/multicast service center.

Second interaction unit 112 is further configured to send the broadcast/multicast service data packet to the base station according to the forwarding indication message.

Optionally, GW-U device 110 connects to the broadcast/multicast service center using an SGi-mb interface. In a session establishment procedure, first interaction unit 111 is further configured to receive, when a sending manner on the SGi-mb interface is a multicast manner, a multicast group join instruction message sent by the GW-C device to GW-U device no. The multicast group join instruction message includes a first multicast group join request message. Third interaction unit 113 is further configured to send the first multicast group join request message to the broadcast/multicast service center, so that the broadcast/multicast service center adds, according to the first multicast group join request message, GW-U device 110 into an IP multicast group using the broadcast/multicast service center as a source point.

Optionally, in the session establishment procedure, the forwarding indication message may include a first forwarding rule, and the first forwarding rule is a rule used when GW-U device 110 processes the signaling sent by the base station to GW-U device no. Second interaction unit 112 is configured to receive a second multicast group join request message sent by the base station. First interaction unit 111 is configured to preprocess the second multicast group join request message according to the first forwarding rule and send a preprocessed second multicast group join request message to the GW-C device, so that the GW-C device adds, according to the preprocessed second multicast group join request message, the base station into an IP multicast group using GW-U device 110 as a source point.

Optionally, in the session establishment procedure, the forwarding indication message may further include a second forwarding rule, and the second forwarding rule is a rule used when GW-U device 110 processes the packet sent by the broadcast/multicast service center to GW-U device 110. The second interaction unit 112 is configured to send the broadcast/multicast service data packet to the base station according to the second forwarding rule.

Further, in a session termination procedure, the forwarding indication message may include a rule deletion instruction. Optionally, GW-U 110 device further includes a rule deletion unit 114 that is configured to delete, according to the rule deletion instruction, a second forwarding rule used when GW-U device 110 processes the broadcast/multicast service data packet.

Optionally, in the session termination procedure, second interaction unit 112 is further configured to receive a first multicast group removal request message sent by the base station. First interaction unit 111 is further configured to preprocess the first multicast group removal request message according to the first forwarding rule and send a preprocessed first multicast group removal request message to the GW-C device, so that the GW-C device removes, according to the preprocessed first multicast group removal request message, the base station from an IP multicast group using GW-U 110 device as a source point.

Optionally, if the sending manner on the SGi-mb interface between the broadcast/multicast service center and GW-U device 110 is the multicast manner, first interaction unit 111 is further configured to receive a multicast group removal instruction message sent by the GW-C device to GW-U device 110. The multicast group removal instruction message includes a second multicast group removal request message. Third interaction unit 113 is further configured to send the second multicast group removal request message to the broadcast/multicast service center. The second multicast group removal request message is used to instruct the broadcast/multicast service center to remove GW-U device 110 from the IP multicast group using the broadcast/multicast service center as the source point.

A person skilled in the art would understand that, for the purpose of convenience and conciseness, for a specific working process and description of the foregoing GW-C device, refer to a corresponding process in Embodiment 6.

According to embodiments of GW-U device 110, behavior of GW-U device 110 is controlled by the GW-C device, and GW-U device 110 just forwards received signaling and a received data packet according to an instruction of the GW-C device. Therefore, after a new function is added into or a new service is deployed in the GW-C device, GW-U device 110 does not need to be modified, allowing the GW-C device and GW-U device 110 to independently evolve.

Embodiment 8

Figure 12:
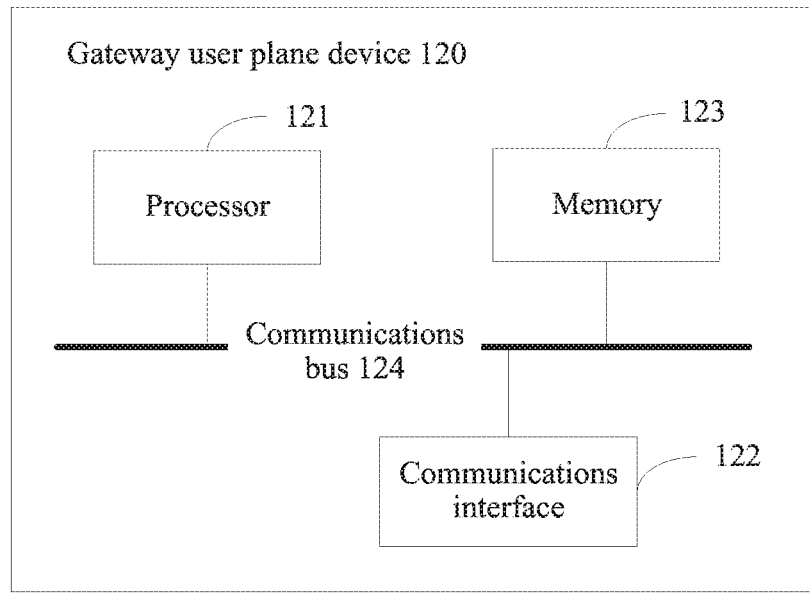
FIG. 12 is a schematic structural diagram of another gateway user plane device according to an embodiment of the present disclosure.

This embodiment of the present disclosure provides another GW-U device 120. As shown in FIG. 12, GW-U device 120 includes a processor 121, a communications interface 122, a memory 123, and a communications bus 124. Processor 121, communications interface 122, and memory 123 communicate with each other using communications bus 124.

Processor 121 may be a multi-core CPU or ASIC, or is configured as one or more integrated circuits implementing this embodiment of the present disclosure.

Memory 123 is configured to store program code, and the program code includes a computer operation instruction and a network flow diagram. Memory 123 may include a high-speed RAM, or may include a non-volatile memory such as at least one magnetic disk memory. Memory 123 may be a memory array. Memory 123 may be divided into blocks, and the blocks may be combined into a virtual volume according to a specific rule.

Communications interface 122 is configured to implement a connection and communication among these components.

Processor 121 is configured to execute the program code in memory 123, to implement operations that include receiving a forwarding indication message sent by a GW-C device. The forwarding indication message is used to instruct GW-U device 120 to process a packet received by GW-U device 120. The operations further include receiving signaling sent by a base station and sending the signaling to the GW-C device according to the forwarding indication message. The operations further include, in a data transmission procedure, receiving a broadcast/multicast service data packet sent by a broadcast/multicast service center and sending the broadcast/multicast service data packet to the base station according to the forwarding indication message.

Optionally, GW-U device 120 connects to the broadcast/multicast service center using an SGi-mb interface and the operations further include receiving, when a sending manner on the SGi-mb interface is a multicast manner, a multicast group join instruction message sent by the GW-C device to GW-U device 120, the multicast group join instruction message including a first multicast group join request message. The operations further include sending the first multicast group join request message to the broadcast/multicast service center, so that the broadcast/multicast service center adds, according to the first multicast group join request message, GW-U device 120 into an IP multicast group using the broadcast/multicast service center as a source point.

Optionally, the forwarding indication message includes a first forwarding rule that is a rule used when GW-U device 120 processes the signaling sent by the base station to GW-U device 120. Receiving signaling sent by a base station and sending the signaling to the GW-C device according to the forwarding indication message includes receiving a second multicast group join request message sent by the base station, preprocessing the second multicast group join request message according to the first forwarding rule, and sending a preprocessed second multicast group join request message to the GW-C device, so that the GW-C device adds, according to the preprocessed second multicast group join request message, the base station into an IP multicast group using GW-U device 120 as a source point.

Optionally, the forwarding indication message includes a second forwarding rule, and the second forwarding rule is a rule used when the GW-U device processes the packet sent by the broadcast/multicast service center to GW-U device 120. Sending the broadcast/multicast service data packet to the base station according to the forwarding indication message includes sending the broadcast/multicast service data packet to the base station according to the second forwarding rule.

Optionally, the forwarding indication message includes a rule deletion instruction and the operations further include deleting, according to the rule deletion instruction, a second forwarding rule used when GW-U device 120 processes the broadcast/multicast service data packet.

Optionally, receiving signaling sent by a base station and sending the signaling to the GW-C device according to the forwarding indication message includes receiving a first multicast group removal request message sent by the base station, preprocessing the first multicast group removal request message according to a first forwarding rule, and sending a preprocessed first multicast group removal request message to the GW-C device, so that the GW-C device removes, according to the preprocessed first multicast group removal request message, the base station from an IP multicast group using GW-U device 120 as a source point.

Optionally, if the sending manner on the SGi-mb interface between the broadcast/multicast service center and GW-U device 120 is the multicast manner, the operations further include receiving a multicast group removal instruction message sent by the GW-C device to GW-U device 120, the multicast group removal instruction message including a second multicast group removal request message, and sending the second multicast group removal request message to the broadcast/multicast service center. The second multicast group removal request message is used to instruct the broadcast/multicast service center to remove GW-U device 120 from the IP multicast group using the broadcast/multicast service center as the source point.

In the various embodiments described in this application, it should be understood that the disclosed system, apparatus, and method may be implemented in other manners. For example, the described apparatus embodiment is merely an example. As a particular example, the unit division is merely logical function division and the actual implementation may include other divisions. For example, multiple units or components may be combined or integrated into another system, or some features may be ignored or not performed.

In addition, the displayed or discussed mutual couplings or direct couplings or communication connections may be implemented using one or more interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium include may include any medium that can store program code, such as a USB flash drive, a removable hard disk, a read-only memory (ROM), a RAM, a magnetic disk, or an optical disc.

Although various embodiments of the present disclosure have been described, a person skilled in the art will understand that the present disclosure contemplates various changes and modifications to these embodiments. Therefore, the following claims are intended to be construed as to cover the described embodiments and all changes and modifications falling within the scope of the present disclosure.

A person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

The invention claimed is:

1. An evolved multimedia broadcast/multicast service (eMBMS) system management method, comprising:
    performing, by a gateway control plane (GW-C) device, core network signaling interaction with a broadcast/multicast service center and a mobility management entity;
    sending, by the GW-C device, a forwarding indication message to a gateway user plane (GW-U) device, the forwarding indication message instructing the GW-U device to process a packet received by the GW-U device;
    receiving, by the GW-U device, signaling from a base station, and sending, by the GW-U device, the signaling to the GW-C device according to the forwarding indication message;
    receiving and processing, by the GW-C device, the signaling sent by the GW-U device; and
    in a data transmission procedure, receiving, by the GW-U device, a broadcast/multicast service data packet from the broadcast/multicast service center, and sending, by the GW-U device, the broadcast/multicast service data packet to the base station according to the forwarding indication message.

2. The method according to claim 1, wherein performing, by the GW-C device, the core network signaling interaction with the broadcast/multicast service center and the mobility management entity comprises, in a session establishment procedure:
    receiving, by the GW-C device, a first session start request message from the broadcast/multicast service center, the first session start request message for establishing a bearer between the GW-U device and the broadcast/multicast service center; and
    sending, by the GW-C device, a second session start request message to the mobility management entity, the second session start request message for establishing a bearer between the base station and the GW-U device.

3. The method according to claim 1, wherein:
    the GW-U device connects to the broadcast/multicast service center using an SGi-mb interface; and
    the method further comprises allocating, by the GW-C device when a sending manner on the SGi-mb interface is a unicast manner, a destination User Datagram Protocol (UDP) port corresponding to the SGi-mb interface.

4. The method according to claim 1, wherein:
    the GW-U device connects to the broadcast/multicast service center using an SGi-mb interface; and
    the method further comprises, when a sending manner on the SGi-mb interface is a multicast manner:
    sending, by the GW-C device, a multicast group join instruction message to the GW-U device, the multicast group join instruction message comprising a first multicast group join request message, and instructing the GW-U device to send the first multicast group join request message to the broadcast/multicast service center;
    sending, by the GW-U device, the first multicast group join request message to the broadcast/multicast service center; and
    adding, by the broadcast/multicast service center according to the first multicast group join request message, the GW-U device into an IP multicast group using the broadcast/multicast service center as a source point.

5. The method according to claim 1, wherein:
    the GW-U device connects to the base station using an M1 interface; and
    the method further comprises allocating, by the GW-C device, an IP multicast address of the M1 interface and a tunnel identifier, the IP multicast address for identifying an IP multicast group using the GW-U device as a source point.

6. The method according to claim 1, wherein:
    the forwarding indication message comprises a first forwarding rule, the first forwarding rule being used when the GW-U device processes the signaling sent by the base station to the GW-U device;
    receiving, by the GW-U device, the signaling from the base station, and sending the signaling to the GW-C device according to the forwarding indication message comprises:
    receiving, by the GW-U device, a second multicast group join request message from the base station;
    preprocessing the second multicast group join request message according to the first forwarding rule; and
    sending a preprocessed second multicast group join request message to the GW-C device; and receiving and processing, by the GW-C device, the signaling sent by the GW-U device comprises, after receiving the preprocessed second multicast group join request message, adding, by the GW-C device according to the preprocessed second multicast group join request message, the base station into an IP multicast group using the GW-U device as a source point.

7. The method according to claim 1, wherein:
the forwarding indication message comprises a second forwarding rule, the second forwarding rule being used when the GW-U device processes the packet sent by the broadcast/multicast service center to the GW-U device; and
sending, by the GW-U device, the broadcast/multicast service data packet to the base station according to the forwarding indication message comprises sending, by the GW-U device, the broadcast/multicast service data packet to the base station according to the second forwarding rule.

8. The method according to claim 1, wherein performing, by the GW-C device, the core network signaling interaction with the broadcast/multicast service center comprises, in a session termination procedure:
receiving, by the GW-C device, a first session termination request message from the broadcast/multicast service center, the first session termination request message comprising specified time information; and
releasing, by the GW-C device, a bearer context at a moment specified by the specified time information.

9. The method according to claim 8, wherein:
sending, by the GW-C device, a forwarding indication message to the GW-U device comprises sending, by the GW-C device, the forwarding indication message to the GW-U device at the moment specified by the specified time information, the forwarding indication message comprising a rule deletion instruction; and
the method further comprises deleting, by the GW-U device according to the rule deletion instruction, a second forwarding rule used when the GW-U device processes the broadcast/multicast service data packet.

10. The method according to claim 8, wherein performing, by the GW-C device, the core network signaling interaction with the mobility management entity comprises sending, by the GW-C device, a second session termination request message to the mobility management entity, the second session termination request message comprising the specified time information, such that the mobility management entity sends the specified time information to the base station, and the base station releases the bearer context according to the specified time information.

11. The method according to claim 8, wherein:
receiving, by the GW-U device, the signaling from the base station, and sending the signaling to the GW-C device according to the forwarding indication message comprises:
receiving, by the GW-U device, a first multicast group removal request message from the base station;
preprocessing the first multicast group removal request message according to a first forwarding rule of the GW-U device; and
sending a preprocessed first multicast group removal request message to the GW-C device; and
receiving and processing, by the GW-C device, the signaling comprises, after receiving the preprocessed first multicast group removal request message, removing, by the GW-C device according to the preprocessed first multicast group removal request message, the base station from an IP multicast group using the GW-U device as a source point.

12. The method according to claim 11, wherein:
the GW-U device connects to the broadcast/multicast service center using an SGi-mb interface; and
the method further comprises, when a sending manner on the SGi-mb interface between the broadcast/multicast service center and the GW-U device being a multicast manner:
sending a multicast group removal instruction message to the GW-U device, the multicast group removal instruction message comprising a second multicast group removal request message, and instructing the GW-U device to send the second multicast group removal request message to the broadcast/multicast service center; and
sending, by the GW-U device, the second multicast group removal request message to the broadcast/multicast service center, the second multicast group removal request message instructing the broadcast/multicast service center to remove the GW-U device from the IP multicast group using the broadcast/multicast service center as the source point.

13. An evolved multimedia broadcast/multicast service (eMBMS) system management method, comprising:
performing, by a gateway control plane (GW-C) device, core network signaling interaction with a broadcast/multicast service center and a mobility management entity;
sending, by the GW-C device, a forwarding indication message to a gateway user plane (GW-U) device, the forwarding indication message instructing the GW-U device to process a packet received by the GW-U device; and
receiving and processing signaling sent by the GW-U device according to the forwarding indication message, the signaling having been sent by a base station to the GW-U device.

14. The method according to claim 13, wherein performing, by the gateway control plane GW-C device, the core network signaling interaction with the broadcast/multicast service center and the mobility management entity comprises, in a session establishment procedure:
receiving a first session start request message from the broadcast/multicast service center, the first session start request message for establishing a bearer between the GW-U device and the broadcast/multicast service center; and
sending a second session start request message to the mobility management entity, the second session start request message for establishing a bearer between the base station and the GW-U device.

15. The method according to claim 13, wherein:
the GW-U device connects to the broadcast/multicast service center using an SGi-mb interface; and
the method further comprises allocating, when a sending manner on the SGi-mb interface is a unicast manner, a destination User Datagram Protocol (UDP) port corresponding to the SGi-mb interface.

16. The method according to claim 13, wherein:
the GW-U device connects to the broadcast/multicast service center using an SGi-mb interface; and
the method further comprises sending, when a sending manner on the SGi-mb interface is a multicast manner, a multicast group join instruction message to the GW-U device, the multicast group join instruction message comprising a first multicast group join request message that instructs the GW-U device to send the first multicast group join request message to the broadcast/multicast service center.

17. The method according to claim 13, wherein:
the GW-U device connects to the base station using an M1 interface; and
the method further comprises allocating an IP multicast address of the M1 interface and a tunnel identifier, the IP multicast address for identifying an IP multicast group using the GW-U device as a source point.

18. The method according to claim 13, wherein:
the forwarding indication message comprises a first forwarding rule, the first forwarding rule being used when the GW-U device processes the signaling sent by the base station to the GW-U device; and
receiving and processing signaling sent by the GW-U device according to the forwarding indication message comprises:
receiving a preprocessed second multicast group join request message from the GW-U device, the preprocessed second multicast group join request message obtained after the GW-U device preprocesses, according to the first forwarding rule, a second multicast group join request message sent by the base station; and
adding, according to the preprocessed second multicast group join request message, the base station into an IP multicast group using the GW-U device as a source point.

19. An evolved multimedia broadcast/multicast service (eMBMS) system management method, comprising:
receiving, by a gateway user plane (GW-U) device, a forwarding indication message from a gateway control plane (GW-C) device, the forwarding indication message instructing the GW-U device to process a packet received by the GW-U device;
receiving, by the GW-U device, signaling from a base station;
sending, by the GW-U device, the signaling to the GW-C device according to the forwarding indication message; and
in a data transmission procedure, receiving, by the GW-U device, a broadcast/multicast service data packet from a broadcast/multicast service center, and sending, by the GW-U device the broadcast/multicast service data packet to the base station according to the forwarding indication message.

20. The method according to claim 19, wherein:
the GW-U device connects to the broadcast/multicast service center using an SGi-mb interface; and
the method further comprises:
receiving, when a sending manner on the SGi-mb interface is a multicast manner, a multicast group join instruction message from the GW-C device, the multicast group join instruction message comprising a first multicast group join request message; and
sending the first multicast group join request message to the broadcast/multicast service center, such that the broadcast/multicast service center adds, according to the first multicast group join request message, the GW-U device into an IP multicast group using the broadcast/multicast service center as a source point.

* * * * *